(12) United States Patent
Kominami et al.

(10) Patent No.: US 12,421,017 B2
(45) Date of Patent: Sep. 23, 2025

(54) DISCHARGE APPARATUS AND UNMANNED AERIAL VEHICLE

(71) Applicant: Toyo Seikan Co., Ltd., Tokyo (JP)

(72) Inventors: Atsushi Kominami, Kanagawa (JP); Souji Araki, Kanagawa (JP)

(73) Assignee: Toyo Seikan Co., Ltd., Tokyo (JP)

( * ) Notice: Subject to any disclaimer, the term of this patent is extended or adjusted under 35 U.S.C. 154(b) by 475 days.

(21) Appl. No.: 17/788,737

(22) PCT Filed: Nov. 6, 2020

(86) PCT No.: PCT/JP2020/041629
§ 371 (c)(1),
(2) Date: Jun. 23, 2022

(87) PCT Pub. No.: WO2021/131354
PCT Pub. Date: Jul. 1, 2021

(65) Prior Publication Data
US 2023/0027548 A1 Jan. 26, 2023

(30) Foreign Application Priority Data
Dec. 25, 2019 (JP) ................................. 2019-234788

(51) Int. Cl.
*B65D 83/303* (2025.01)
*B64C 39/02* (2023.01)
(Continued)

(52) U.S. Cl.
CPC .......... *B65D 83/303* (2013.01); *B64C 39/024* (2013.01); *B64D 1/18* (2013.01); *B64U 30/20* (2023.01)

(58) Field of Classification Search
CPC ........................... B64D 83/303; B64C 39/024
See application file for complete search history.

(56) References Cited

U.S. PATENT DOCUMENTS 3,575,319 A * 4/1971 Safianoff .............. B65D 83/682
222/459
4,958,750 A * 9/1990 Palmert .................. B65D 83/68
239/304

(Continued)

FOREIGN PATENT DOCUMENTS

| CN | 204769261 U | 11/2015 |
| CN | 208230196 U | 12/2018 |

(Continued)

OTHER PUBLICATIONS

Machine translation of JP-2007252274-A.*
(Continued)

*Primary Examiner* — Jeremy Carroll

(57) ABSTRACT

A discharge apparatus for discharging contents in an aerosol container, comprising, a first flow channel connected to an aerosol container; a second flow channel connected to the first flow channel; a support configured to support at least a part of the second flow channel; and a change unit configured to change a shape of the second flow channel, wherein the support changes a support position of the second flow channel in response to a change in a shape of the second flow channel, is provided. In addition, an unmanned aerial vehicle on which the discharge apparatus is mounted is provided.

18 Claims, 22 Drawing Sheets

(51) Int. Cl.
*B64D 1/18* (2006.01)
*B64U 30/20* (2023.01)

(56) References Cited

U.S. PATENT DOCUMENTS

| | | | | |
|---|---|---|---|---|
| 5,307,964 | A * | 5/1994 | Toth | B65D 83/206 |
| | | | | 222/527 |
| 6,021,793 | A | 2/2000 | Moulder | |
| 6,663,307 | B2 * | 12/2003 | Kopanic | A01M 7/0046 |
| | | | | 222/174 |
| 2006/0118107 | A1 | 6/2006 | King | |
| 2010/0084435 | A1 * | 4/2010 | Paauwe | B67D 1/1405 |
| | | | | 222/23 |
| 2016/0355258 | A1 * | 12/2016 | Williams | B05B 15/62 |
| 2017/0203318 | A1 | 7/2017 | Vahanen | |
| 2021/0061543 | A1 | 3/2021 | Murakami | |
| 2024/0189850 | A1 * | 6/2024 | Knudson | B65D 83/262 |

FOREIGN PATENT DOCUMENTS

| | | | |
|---|---|---|---|
| JP | S60165062 | * | 11/1985 |
| JP | S60165062 U | | 11/1985 |
| JP | H08275708 | * | 10/1996 |
| JP | H08275708 A | | 10/1996 |
| JP | 2007252274 A | * | 10/2007 |
| JP | 2010111407 A | | 5/2010 |
| JP | 2011050535 A | | 3/2011 |
| JP | 2019018589 A | | 2/2019 |
| WO | WO-2019138576 A1 * | 7/2019 | ............. A01M 7/00 |

OTHER PUBLICATIONS

Machine translation of JP H08275708.*
Machine translation of JP S60165062.*
Machine translation of WO 2019138576.*
Office Action issued for counterpart Japanese Application No. 2019-234788, transmitted from the Japanese Patent Office on Feb. 25, 2020 (drafted on Feb. 20, 2020).
Office Action issued for counterpart Taiwanese Application 109145239, transmitted from the Taiwan Intellectual Property Office on May 28, 2024 (issued on May 23, 2024).
(ISA/237) Written Opinion of the International Search Authority for International Patent Application No. PCT/JP2020/041629, issued/mailed by the Japan Patent Office on Jan. 26, 2021.

* cited by examiner

DISCHARGE APPARATUS AND UNMANNED AERIAL VEHICLE

CROSS-REFERENCE TO RELATED APPLICATIONS

This application is a National Stage Entry of International Application No. PCT/JP2020/041629 filed on Nov. 6, 2020, which claims priority to Japanese Patent Application No. 2019-234788 filed on Dec. 25, 2019, the contents of each of which are hereby incorporated by reference in their entirety.

BACKGROUND

1. Technical Field

The present invention relates to a discharge apparatus and an unmanned aerial vehicle.

2. Related Art

Conventionally, an unmanned aerial vehicle including a jetting nozzle is known (e.g., see Patent Document 1).
Patent Document 1: Japanese Patent Application Publication No. 2019-18589

Technical Problem

In a conventional unmanned aerial vehicle, it is preferable that a discharge direction can be easily changed.

General Disclosure

In the first aspect of the present invention, a discharge apparatus for discharging contents in an aerosol container, including, a first flow channel connected to an aerosol container; a second flow channel connected to a first flow channel; a support configured to support at least a part of a second flow channel; and a change unit configured to change a shape of the second flow channel, wherein the support changes a support position of the second flow channel in response to a change in a shape of the second flow channel, is provided.

The second flow channel may have a supporting section that can be supported by the support and a non-supporting section that is different from the supporting section. The supporting section and the non-supporting section may be configured to change in response to a change in a shape of the second flow channel by the change unit.

The discharge apparatus may include a containing unit configured to contain the aerosol container. The first flow channel may be fixed to the containing unit.

The support may have a circular structure through which the second flow channel passes.

The change unit may be coupled to the support, and may be configured to change a shape of the second flow channel by changing a position of the support.

The change unit may change a shape of the second flow channel by changing a position of the first flow channel.

The support may have a tubular structure inside which the second flow channel passes. The change unit may be configured to change the shape of the second flow channel by rotationally moving the support in a predefined direction.

The change unit may have a plurality of rotation mechanisms each of which is configured to rotate about a different axis.

The support may have an annular structure inside which the second flow channel passes. The change unit may be configured to change the shape of the second flow channel by translating or rotationally moving the support in a predefined direction.

A tip of the second flow channel may be free with respect to the support.

The support may have a supporting fixture member fixed to a tip of the second flow channel and configured to support at least a part of the second flow channel.

The support may have a supporting member configured to support at least a part of the second flow channel, and a tip member fixed to a tip of the second flow channel, and movable relative to the supporting member in an axial direction of the second flow channel.

The supporting member may have an outer diameter that is smaller than an inner diameter of the tip member.

The tip member may have an outer diameter that is smaller than an inner diameter of the supporting member.

The support may have a supporting member configured to support at least a part of the second flow channel, and a tip member fixed to a tip of the second flow channel, and movable relative to the supporting member in an circumferential direction of the second flow channel The tip member may also serve as an discharge unit configured to discharge the contents in the aerosol container.

The support may have a camera.

The support may have a distance-measurement sensor for measuring a distance from an object.

In the second aspect of the present invention, an unmanned aerial vehicle on which the discharge apparatus according to the first aspect of the present invention is mounted is provided.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims. And all the combinations of the features described in the embodiment(s) are not necessarily essential to means provided by aspects of the invention.

Figure 1A:
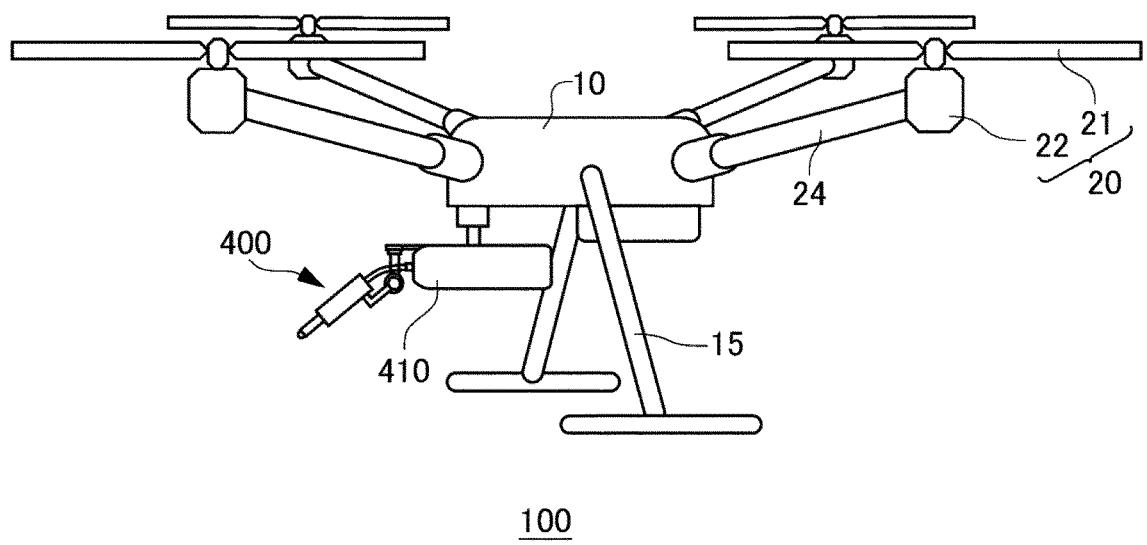
FIG. 1A shows an overview of a configuration of an unmanned aerial vehicle 100.

FIG. 1A shows an overview of a configuration of an unmanned aerial vehicle 100. The unmanned aerial vehicle 100 is a flight vehicle that flies in the air. The unmanned aerial vehicle 100 in the present example includes a body unit 10, a propelling unit 20, and a discharge apparatus 400. The discharge apparatus 400 of the present example includes a containing unit 410. The discharge apparatus 400 can change its discharge direction to any directions. A change method of the discharge direction will be described below.

The body unit 10 stores various control circuits, a power supply, and the like of the unmanned aerial vehicle 100. The body unit 10 may also function as a structure that couples components of the unmanned aerial vehicle 100 with each other. The body unit 10 of the present example is coupled to the propelling unit 20.

The propelling unit 20 propels the unmanned aerial vehicle 100. The propelling unit 20 has a rotary blade 21 and a rotation drive unit 22. The unmanned aerial vehicle 100 of the present example includes four propelling units 20. The propelling unit 20 is attached to the body unit 10 via an arm unit 24.

The propelling unit 20 generates propulsion force through the rotation of the rotary blade 21. While four rotary blades 21 are provided around the body unit 10, the method of arranging the rotary blades 21 is not limited to the present example. The rotary blade 21 is provided on the tip of the arm unit 24 via the rotation drive unit 22.

The rotation drive units 22 have power sources such as motors to drive the rotary blades 21. The rotation drive units 22 may have brake mechanisms for the rotary blades 21. The rotary blade 21 and the rotation drive unit 22 may be attached directly to the body unit 10 without the arm unit 24.

The arm unit 24 is provided extending radially from the body unit 10. The unmanned aerial vehicle 100 of the present example includes four arm units 24 provided corresponding to four propelling units 20. The arm unit 24 may be either fixed or movable. The arm unit 24 may have another component such as a camera fixed thereto.

The containing unit 410 contains the container 70 described below filled with the discharged contents. The containing unit 410 is coupled to the body unit 10 via a coupling unit. The containing unit 410 may be coupled to a member other than the body unit 10 such as the arm unit 24 or the leg unit 15. In an example, the containing unit 410 is a tubular sleeve that contains the container 70.

A material of the containing unit 410 is not particularly limited as long as it can retain the shape of a containing unit configured to contain the container 70. For example, the material of the containing unit 410 includes metal such as aluminum, plastic, or a highly strong and lightweight raw material such as carbon fiber or the like. In addition, a material of the containing unit 410 is not limited to a hard material, but may include a soft material, for example, a rubber material such as silicone rubber or polyurethane foam. Note that the containing unit 410 may include a heating mechanism for heating the container 70 or keeping the container 70 warm.

The container 70 is a container to be filled with the contents. In an example, the container 70 is an aerosol container that discharges the contents with which the inside of the aerosol container is filled. The aerosol container sprays the contents by gas pressure of liquefied gas or compressed gas with which the inside of the aerosol container is filled. Although the container 70 of the present example is a metal aerosol can, it may be a plastic container having a pressure resistance. The container 70 is mounted while being contained by the containing unit 410.

The contents may be any one of a liquid, a gas, or a solid. The contents may be in a powdery, granular, or gel shape state, or the like. The contents may include pesticide or repairing agent.

Note that a jetting agent to be used may include the liquefied gas such as hydrocarbon (liquefied petroleum gas) (LPG), dimethyl ether (DME), and hydrofluorocarbon (HFO-1234ze), and the compressed gas such as carbon dioxide ($CO_2$), nitrogen ($N_2$), and nitrogen monoxide ($N_2O$).

The leg unit 15 is coupled to the body unit 10 and retains the posture of the unmanned aerial vehicle 100 during landing. The unmanned aerial vehicle 100 of the present example has two leg units 15. By a plurality of leg units 15 respectively extending to different lengths, it is possible to stably retain the posture of the unmanned aerial vehicle 100 even on the sloped ground or an uneven surface.

Figure 1B:
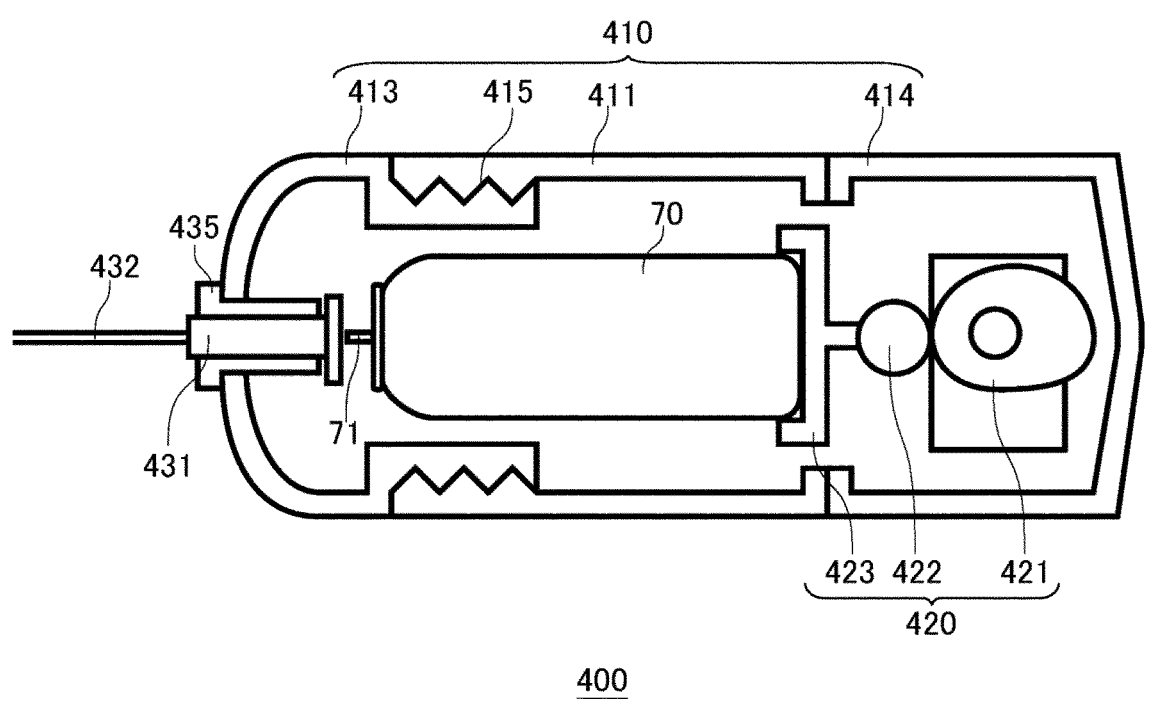
FIG. 1B shows an example of a configuration of a discharge apparatus 400.

FIG. 1B shows an example of a configuration of the discharge apparatus 400. The discharge apparatus 400 includes a containing unit 410, a discharge drive unit 420, a first flow channel 431, and a second flow channel 432. FIG. 1B shows a cross-sectional view of the containing unit 410. The discharge apparatus 400 of the present example discharges the contents in the container 70.

The containing unit 410 contains the container 70 and discharges the contents in the container 70. The containing unit 410 of the present example has a body 411, a first end cover unit 413, and a second end cover unit 414. Also, the containing unit 410 contains the discharge drive unit 420 for controlling the discharging from the container 70.

The body 411 contains the container 70. The body 411 has a cylindrical shape that has a larger diameter than the container 70. The body 411 of the present example is interposed between the first end cover unit 413 and the second end cover unit 414.

The first end cover unit 413 covers one end of the body 411. The first end cover unit 413 of the present example covers the end on the jetting side of the container 70. The first end cover unit 413 is detachably screwed into the body 411 via a screw unit 415. The first end cover unit 413 of the present example has a dome-shaped cover body. The first end cover unit 413 is tapered gradually in its diameter toward the tip by taking into account the aerodynamic characteristics. The first end cover unit 413 has a curved surface in the shape of a cone with a rounded tip or of a dome. Having such a shape with the excellent aerodynamic characteristics can reduce influence of a side wind and stabilize the flight.

In the body 411, the second end cover unit 414 covers the other end which is different from the end covered by the first end cover unit 413. The second end cover unit 414 of the present example covers the end opposite to the jetting side of the container 70. The second end cover unit 414 is configured integrally with the body 411. The second end cover unit 414 may also be provided to be removable from the body 411.

The discharge drive unit 420 discharges the contents from the container 70. The discharge drive unit 420 is accommodated in the second end cover unit 414 located at the bottom side of the container 70. The second end cover unit 414 functions as an enclosure for the discharge drive unit 420. The discharge drive unit 420 includes a cam 421, a cam follower 422, and a movable plate 423. Because the discharge drive unit 420 is provided in the containing unit 410, the discharge drive unit 420 does not need to be replaced during replacement of the container 70.

The cam 421 is rotatively driven by a drive source. In an example, a motor is used as the drive source. The cam 421 has a structure having a varying distance from the center of rotation to the outer circumference. Note that, in the example shown, the shape of the cam 421 is exaggerated. The cam 421 contacts the cam follower 422 on the outer circumference.

The cam follower 422 is provided between the cam 421 and the movable plate 423. The cam follower 422 is connected to the cam 421 and the movable plate 423, and transmits a rotational movement of the cam 421 to the movable plate 423 as a linear movement.

The movable plate 423 is provided in contact with the bottom surface of the container 70 and controls opening and closing of a valve of the container 70. The movable plate 423 moves back and forth by means of the cam follower 422. For example, when the distance is shorter between the center of rotation of the cam 421 and a contact region of the cam 421 on which the cam follower 422 abuts, the movable plate 423 retracts with respect to the container 70 and the valve of the container 70 is closed. On the other hand, when the distance is longer between the center of rotation of the cam 421 and the contact region of the cam 421 on which the cam follower 422 abuts, the movable plate 423 advances with respect to the container 70 and the valve of the container 70 is opened.

Note that the discharge drive unit 420 has a configuration in which a rotational movement of the motor is converted into a linear movement by a cam mechanism, but it is not limited to the cam mechanism. For example, the mechanism of the discharge drive unit 420 may be any mechanism that converts the rotational movement of the motor into the linear movement, such as a screw feeding mechanism or a rack and pinion. In addition, the drive source may provide a linear motor for linear driving or an electromagnetic solenoid and the like, instead of the rotary motor.

A stem 71 is provided on the container 70. By the stem 71 being pressed by an actuator 435, the contents are discharged from the container 70. The actuator 435 has the first flow channel 431 according to a discharge direction and a discharging form. In an example, the actuator 435 discharges the contents in a spray form.

The first flow channel 431 is connected to the container 70. The first flow channel 431 is a flow channel in which the contents in the container 70 flow. The first flow channel 431 of the present example is provided on a tip of the first end cover unit 413. The first flow channel 431 is provided inside the actuator 435. The first flow channel 431 of the present example is fixed to the containing unit 410.

The second flow channel 432 is connected to the first flow channel 431. The second flow channel 432 is a flow channel in which the contents from the first flow channel 431 flow. In an example, the second flow channel 432 is formed of a material that is more flexible than the first flow channel 431. By changing the shape of the second flow channel 432, a discharge direction of the discharge apparatus 400 can be controlled. The second flow channel 432 may be made of a material that is bent not at an acute angle but at any curvatures. The second flow channel 432 can suppress a pressure loss by having a smooth curve.

Note that, in the present example, although the container 70 is directly mounted to the containing unit 410, the container 70 may be contained by a containing member, and the containing member may be mounted to the containing unit 410. Because the containing member protects the container 70 from an impact, safety at a time of an accident is enhanced.

Since the container 70 of the present example is the aerosol container, the container 70, even when it is emptied, can be easily replaced by simply mounting a new container 70. In addition, the contents are unlikely to adhere to human bodies, providing excellent safety during replacement.

Figure 1C:
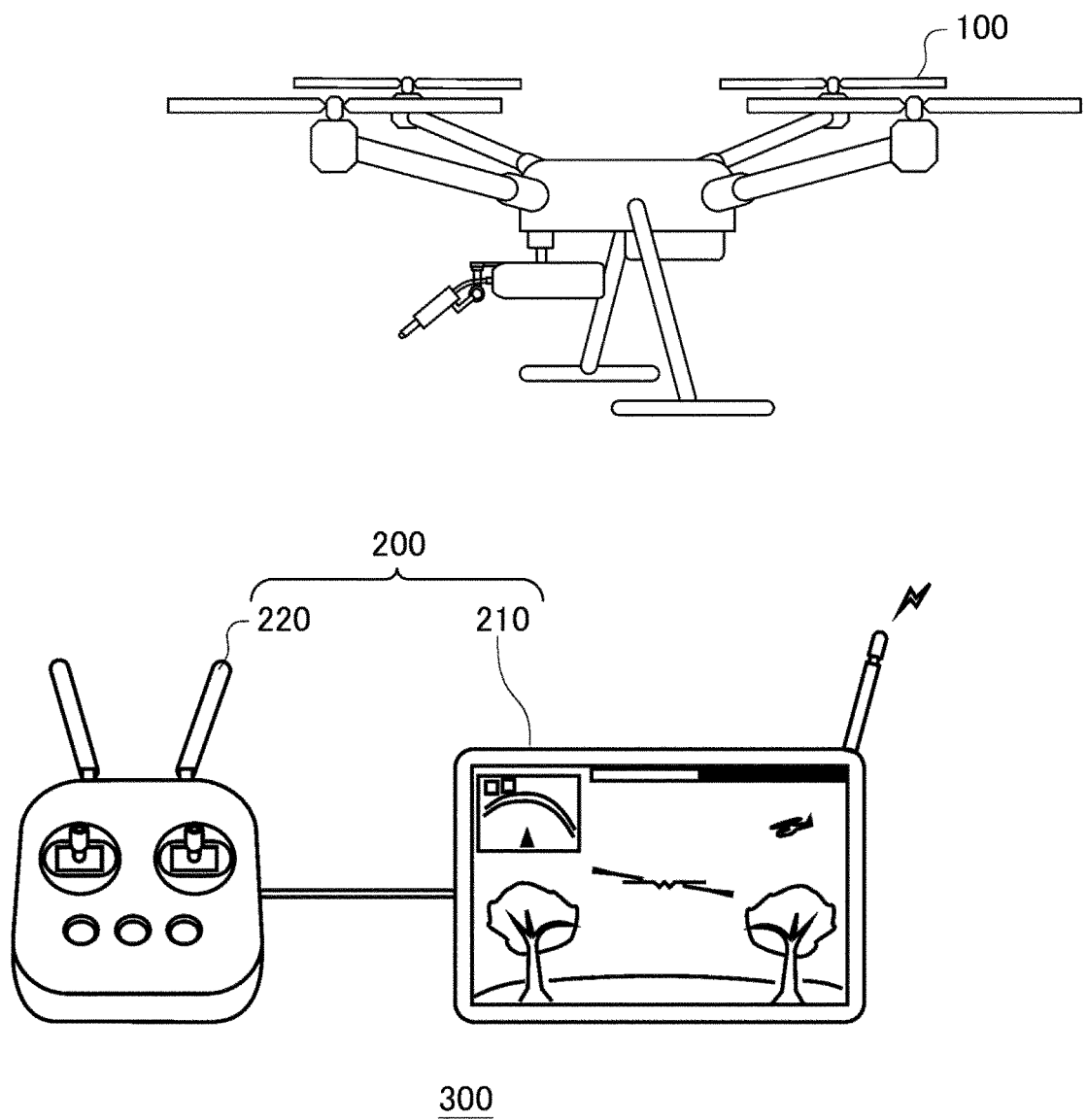
FIG. 1C shows an example of a discharge system 300 of the unmanned aerial vehicle 100.

FIG. 1C shows an example of a discharge system 300 of the unmanned aerial vehicle 100. The discharge system 300 of the present example includes the unmanned aerial vehicle 100 and a terminal device 200. The terminal device 200 has a display unit 210 and a controller 220.

The display unit 210 displays the video captured by the camera mounted to the unmanned aerial vehicle 100. The display unit 210 may display the videos captured by each of the fixed camera and the movable camera. For example, the display unit 210 displays the videos from the fixed camera and the movable camera on a split screen. The display unit 210 may communicate directly with the unmanned aerial vehicle 100, or may communicate indirectly with the unmanned aerial vehicle 100 via the controller 220. The display unit 210 may be connected with an external server.

The controller 220 is operated by the user to maneuver the unmanned aerial vehicle 100. In addition to the flight of the unmanned aerial vehicle 100, the controller 220 may instruct the discharge of the contents performed by the discharge apparatus 400. The controller 220 may be connected with the display unit 210 either by wired or wireless connection. A plurality of controllers 220 may be provided to be separately used for maneuvering the unmanned aerial vehicle 100 and for controlling the discharge of the discharge apparatus 400.

Note that the user of the present example uses the terminal device 200 to maneuver the unmanned aerial vehicle 100 manually. However, the user may automatically, not manually, maneuver by a program. In addition, the user may maneuver the unmanned aerial vehicle 100 while viewing it directly without using the screen displayed on the display unit 210. Also, the user may automatically control the maneuvering of the unmanned aerial vehicle 100 and manually operate the discharge of the discharge apparatus 400.

Figure 2A:
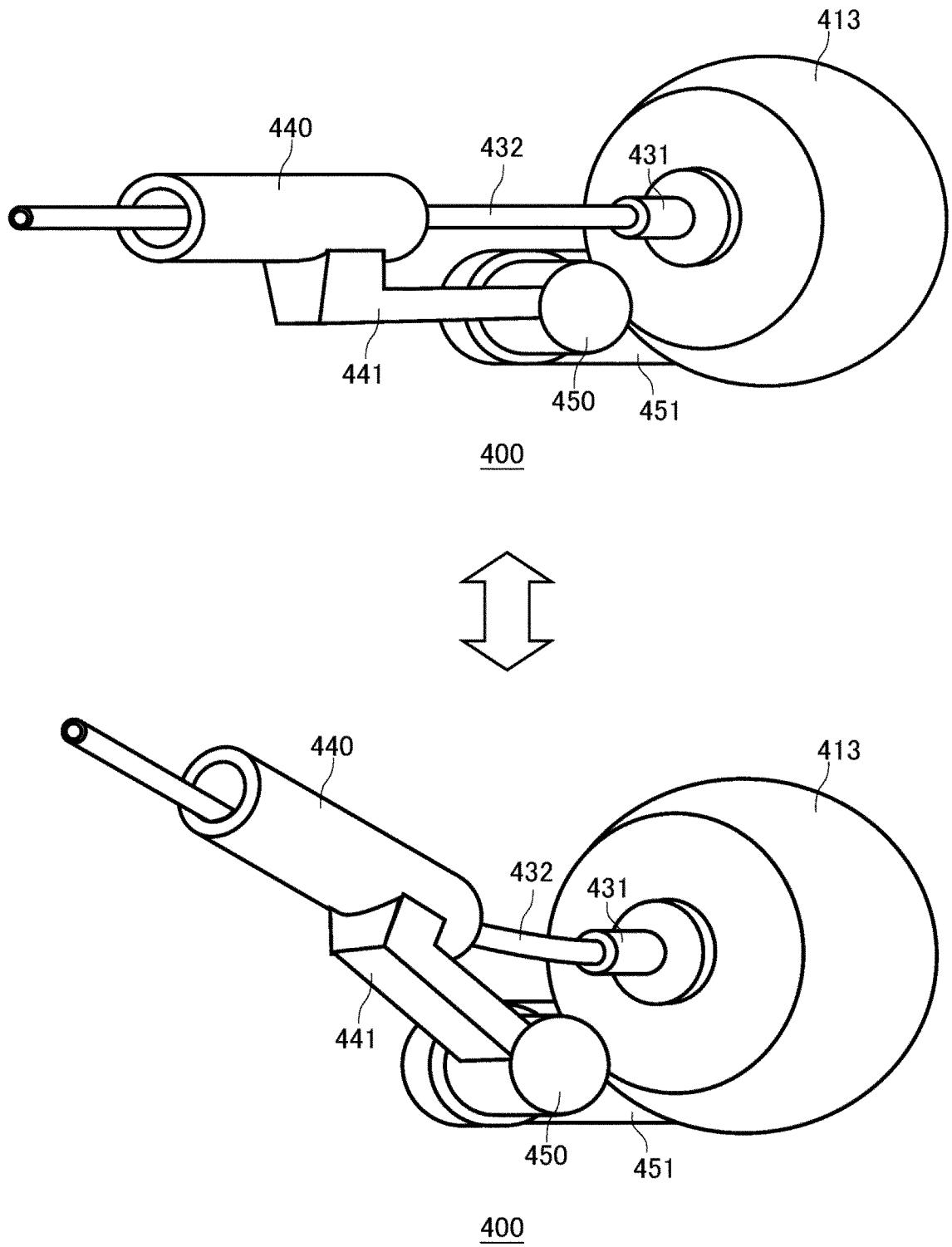
FIG. 2A shows an example of a configuration of the discharge apparatus 400.

FIG. 2A shows an example of a configuration of the discharge apparatus 400. The discharge apparatus 400 includes a support 440 and a change unit 450. The discharge apparatus 400 of the present example can change its discharge direction of contents to any directions.

The support 440 supports at least a part of the second flow channel 432. However, depending on the discharge direction of the second flow channel 432, the support 440 may not support the second flow channel 432. The support 440 changes a support position of the second flow channel 432 in response to a change in a shape of the second flow channel 432. That is, because the second flow channel 432 is not fixed to the support 440, the position of the second flow channel 432 can be flexibly changed according to the position of the support 440. This facilitates to reduce a pressure loss in the second flow channel 432 even if the discharge direction of the discharge apparatus 400 is changed. The support 440 of the present example has a circular structure through which the second flow channel 432 passes. The support 440 of the present example has a tubular structure inside which the second flow channel 432 passes. Note that the structure of the support 440 is not limited to a circle, but may be in any shapes such as a polygon.

The coupling unit 441 is coupled to the support 440. The coupling unit 441 of the present example couples the support 440 with the change unit 450. The coupling unit 441 of the present example is provided along the discharge direction. The shape of the coupling unit 441 may be changed whenever appropriate according to the length of the second flow channel 432 or the like. The coupling unit 441 may be formed integrally with the support 440 and the change unit 450.

The change unit 450 changes the shape of the second flow channel 432. The change unit 450 of the present example changes the shape of the second flow channel 432 by being coupled to the support 440 and changing the position of the support 440. In an example, the change unit 450 translates or rotationally moves the position of the support 440. In the change unit 450 of the present example, the shape of the second flow channel 432 is changed by rotationally moving the support 440 in a predefined direction.

The coupling unit 451 is coupled to the change unit 450. The coupling unit 451 of the present example couples the change unit 450 with the containing unit 410. The coupling unit 451 may couple the change unit 450 to another component such as the body unit 10, or the leg unit 15, or the like. The coupling unit 451 may be formed integrally with the change unit 450.

The tip of the second flow channel 432 is free with respect to the support 440. The tip of the second flow channel 432 being free means that the tip of the second flow channel 432 is not fixed to another member. That is, because the tip of the second flow channel 432 is not constrained, the shape of the second flow channel 432 can be freely changed. When the tip of the second flow channel 432 is free with respect to the support 440, the shape is adjusted on the tip side of the second flow channel 432 even in the case where the basal side of the second flow channel 432 becomes tight. This decreases a resistance accompanied by a deformation of the second flow channel 432 and mitigates a load of the change unit 450. An adjusting method of the second flow channel 432 will be described below.

The discharge apparatus 400 of the present example can attach the support 440 and the change unit 450 to any containing units 410. Thus, the discharge apparatus 400 can adapt to a container 70 of a different size or type. Also, the discharge apparatus 400 may change an adjusting method of the discharge direction whenever appropriate according to the type or purpose of the contents in the container 70.

Figure 2B:
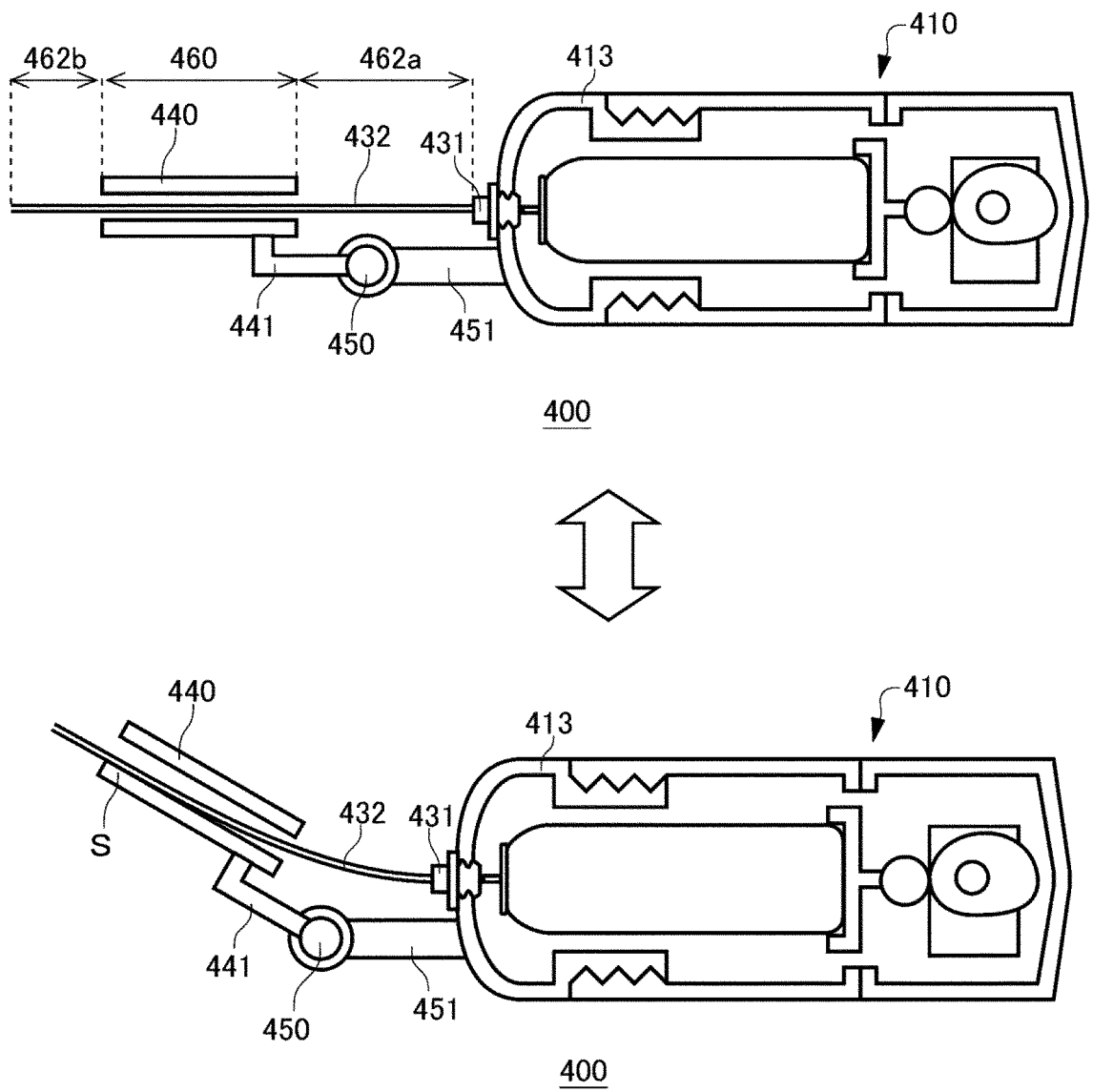
FIG. 2B shows an example of a cross-sectional view of the discharge apparatus 400 according to FIG. 2A.

FIG. 2B shows an example of a cross-sectional view of the discharge apparatus 400 according to FIG. 2A. In the discharge apparatus 400 of the present example, its discharge direction of contents is changed to a different direction. The second flow channel 432 has a supporting section 460 and a non-supporting section 462.

A supporting point S is a support point between the second flow channel 432 and the support 440. When the second flow channel 432 is not bent, it is not necessary to have the supporting point S between the second flow channel 432 and the support 440. Although the second flow channel 432 is supported at the supporting point S by the support 440, it is not fixed. That is, the second flow channel 432 may be supported at a different supporting point S according to its shape. This allows the shape of the second flow channel 432 to have an appropriate curve, and thus a pressure loss in the second flow channel 432 can be reduced.

The supporting section 460 is a section that can be supported by the support 440. For example, the supporting section 460 is a section where the second flow channel 432 is covered by the support 440. The supporting section 460 is configured to change in response to a change in a shape of the second flow channel 432 by the change unit 450.

The non-supporting section 462 is a section that is different from the supporting section 460 in the second flow channel 432. For example, the non-supporting section 462 is a section where the second flow channel 432 is not covered by the support 440. The non-supporting section 462 has a non-supporting section 462*a* and a non-supporting section 462*b*. The non-supporting section 462*a* and the non-supporting section 462*b* can change. However, a total area of the supporting section 460 and the non-supporting section 462 is constant.

The non-supporting section 462*a* is a non-supporting section that is closer to the first flow channel 431 than the supporting section 460. For example, the non-supporting section 462*b* is a non-supporting section that is closer to the tip of the second flow channel 432 than the supporting section 460. The length of the non-supporting section 462 is determined according to a material of the second flow channel 432 or the like. The non-supporting section 462 is configured to change in response to a change in a shape of the second flow channel 432 by the change unit 450.

The discharge apparatus 400 of the present example can change the supporting section 460 and the non-supporting section 462 according to the shape of the second flow channel 432. Thereby, the shape of the second flow channel 432 has an appropriate curve, and thus a pressure loss in the second flow channel 432 can be reduced.

Figure 2C:
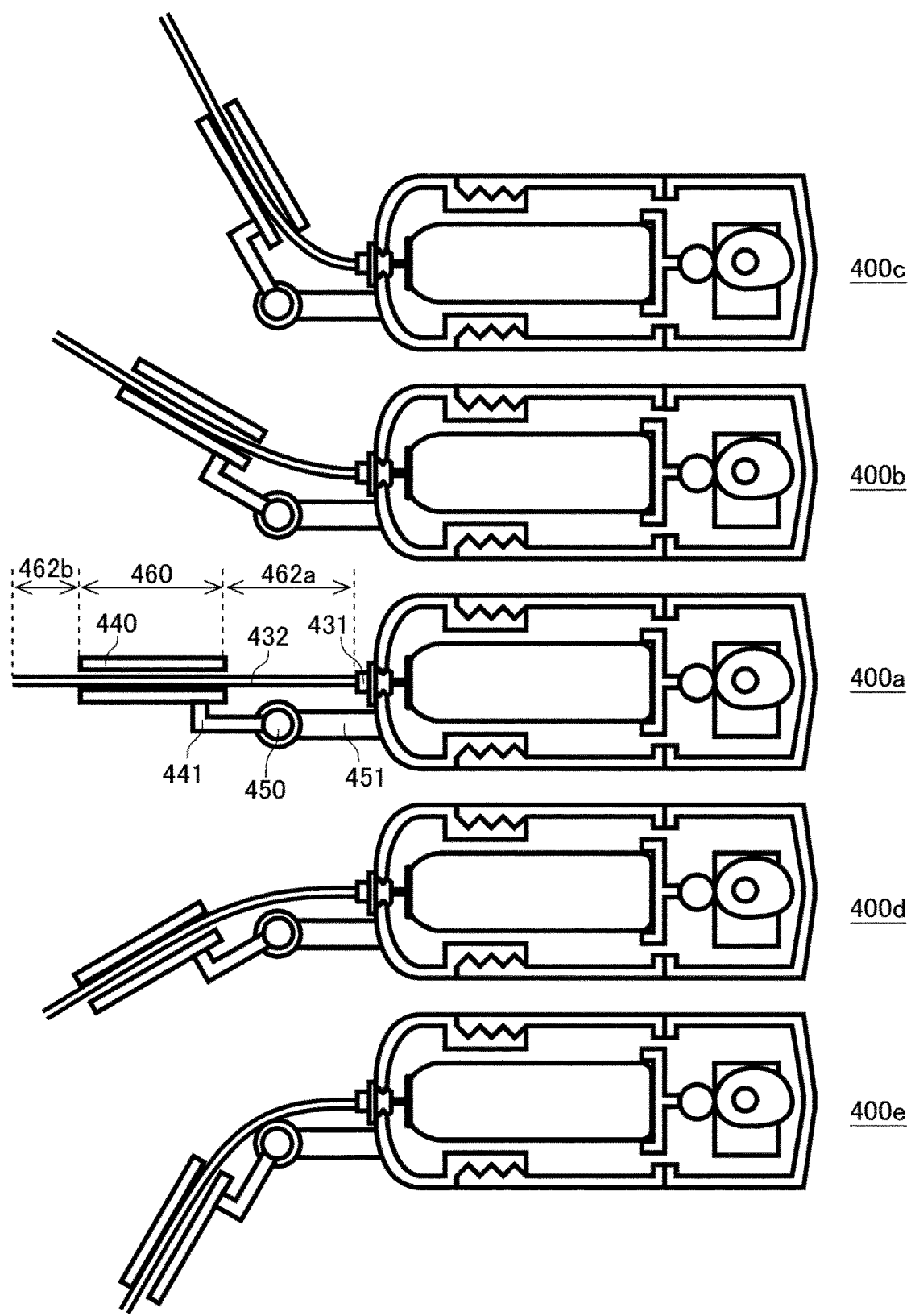
FIG. 2C shows an example of an operation method of the discharge apparatus 400.

FIG. 2C shows an example of an operation method of the discharge apparatus 400. In the present example, changes of the supporting section 460 and the non-supporting section 462 when the support 440 is rotationally moved about the change unit 450 is described.

The discharge apparatus 400*a* is in a state with the second flow channel 432 directed to face the front. In the present example, the description will be provided using the discharge apparatus 400*a* as the reference state. In the reference state, the change unit 450 is provided below the second flow channel 432. Note that the supporting section 460 and the non-supporting section 462 may change differently from the present example according to a position of the change unit 450 in the reference state. Also, the supporting section 460 and the non-supporting section 462 may change differently from the present example according to a length of the coupling unit 441 and the coupling unit 451.

The discharge apparatus 400*b* is a state in which the support 440 moved higher above than that of the reference state. The discharge apparatus 400*c* is a state in which the support 440 moved further higher above than the state of the discharge apparatus 400*b*. In the discharge apparatus 400*b* and the discharge apparatus 400*c*, the non-supporting section 462*a* becomes shorter than that of the reference state and the non-supporting section 462*b* becomes longer than that of the reference state.

The discharge apparatus 400*d* is a state in which the support 440 moved below that of the reference state. The discharge apparatus 400*e* is a state in which the support 440 moved further lower below than the state of the discharge apparatus 400*d*. In the discharge apparatus 400*d* and the discharge apparatus 400*e*, the non-supporting section 462*a* becomes longer than that of the reference state and the non-supporting section 462*b* becomes shorter than that of the reference state.

In this manner, because the tip of the second flow channel 432 is free, the discharge apparatus 400 can freely adjust lengths of the supporting section 460 and the non-supporting section 462. Accordingly, the discharge apparatus 400 can appropriately change the shape of the second flow channel 432 in response to a change in the discharge direction.

Figure 3A:
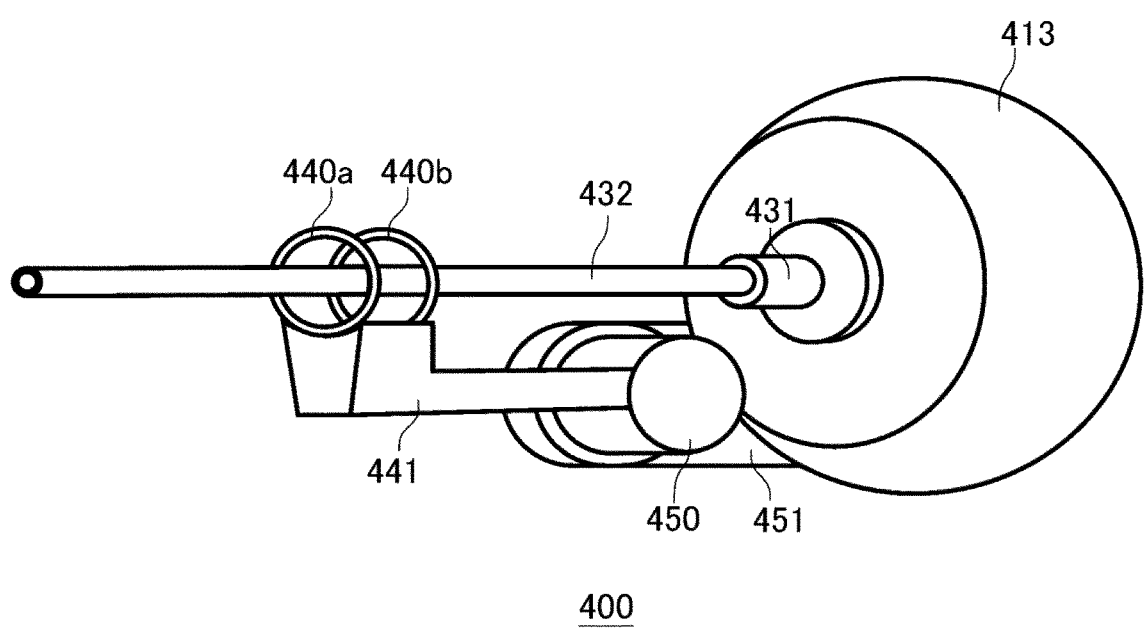
FIG. 3A shows an example of a configuration of the discharge apparatus 400.

FIG. 3A shows an example of a configuration of the discharge apparatus 400. The discharge apparatus 400 of the present example includes the support 440 with a different shape from that of FIG. 2A.

The support 440 supports the second flow channel 432. The discharge apparatus 400 of the present example has two supports 440*a* and 440*b*. The supports 440*a* and 440*b* of the present example are disposed in a parallel manner, but not limited to this. The supports 440*a* and 440*b* may be disposed with a height difference. The support 440 of the present example can change the shape of the second flow channel 432 by being moved by the change unit 450. The support 440 of the present example has an annular structure inside which the second flow channel 432 passes. Note that the supports 440*a* and 440*b* may have different shapes.

The change unit 450 changes the shape of the second flow channel 432 by moving the support 440 in a predefined direction. For example, the change unit 450 of the present example changes the shape of the second flow channel 432 by rotationally moving the support 440 in a predefined direction.

Figure 3B:
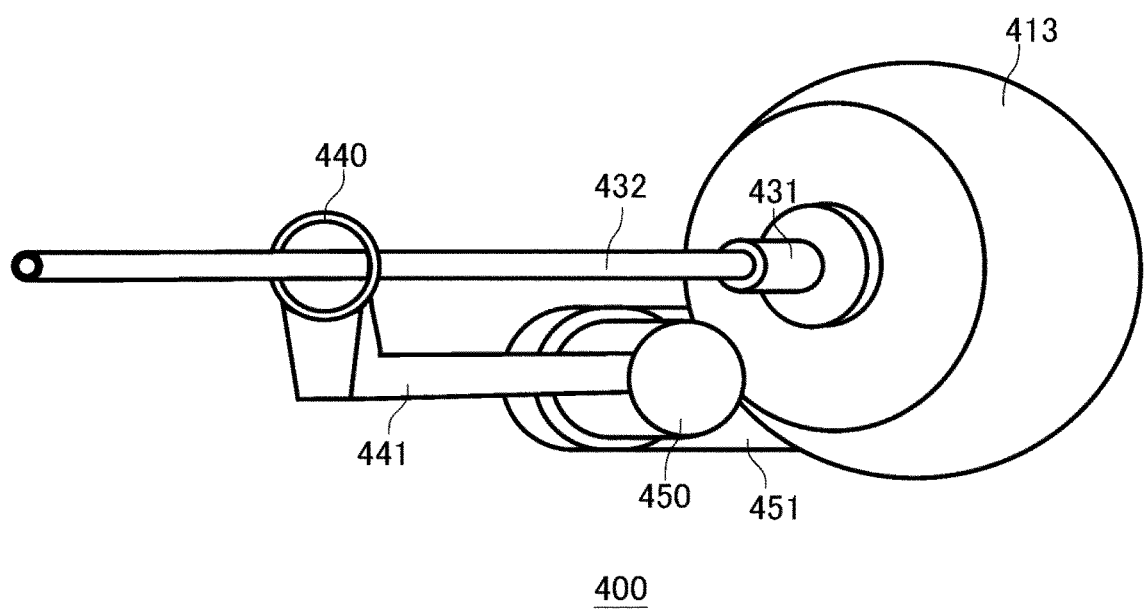
FIG. 3B shows an example of a configuration of the discharge apparatus 400.

FIG. 3B shows an example of a configuration of the discharge apparatus 400. The discharge apparatus 400 of the present example includes the support 440 with a different shape from that of FIG. 2A. The support 440 of the present example has an annular structure inside which the second flow channel 432 passes.

The change unit 450 changes the shape of the second flow channel 432 by moving the support 440 in a predefined direction. For example, the change unit 450 changes the shape of the second flow channel 432 by translating or rotationally moving the support 440.

Figure 4A:
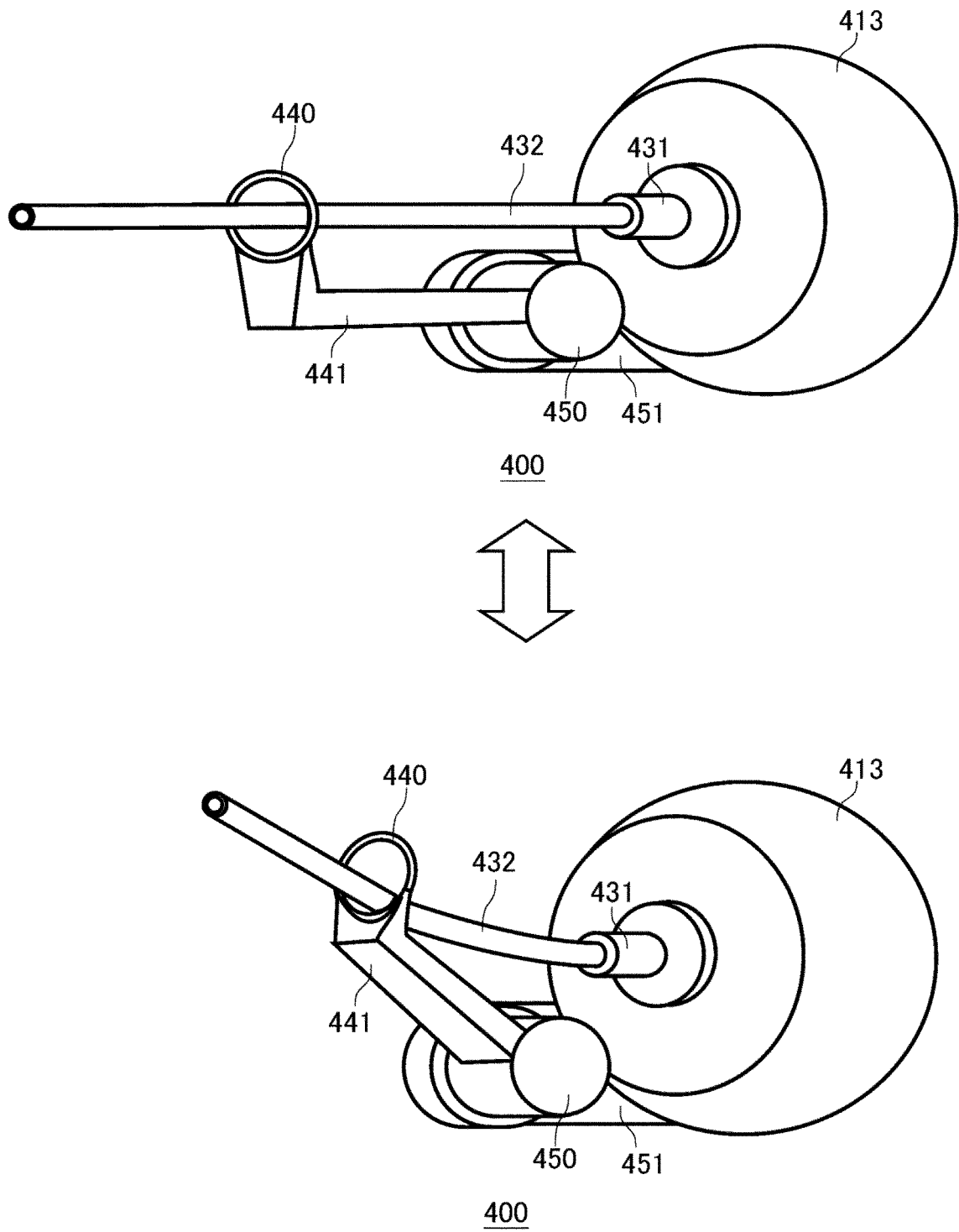
FIG. 4A shows an example of an operation method of a change unit 450.

FIG. 4A shows an example of an operation method of a change unit 450. The change unit 450 of the present example changes the shape of the second flow channel 432 by rotationally moving the support 440 in a predefined direction. For example, the change unit 450 can change inclination and height of discharging by rotating the support 440. This allows the discharge apparatus 400 to change the discharge direction of the content.

Figure 4B:
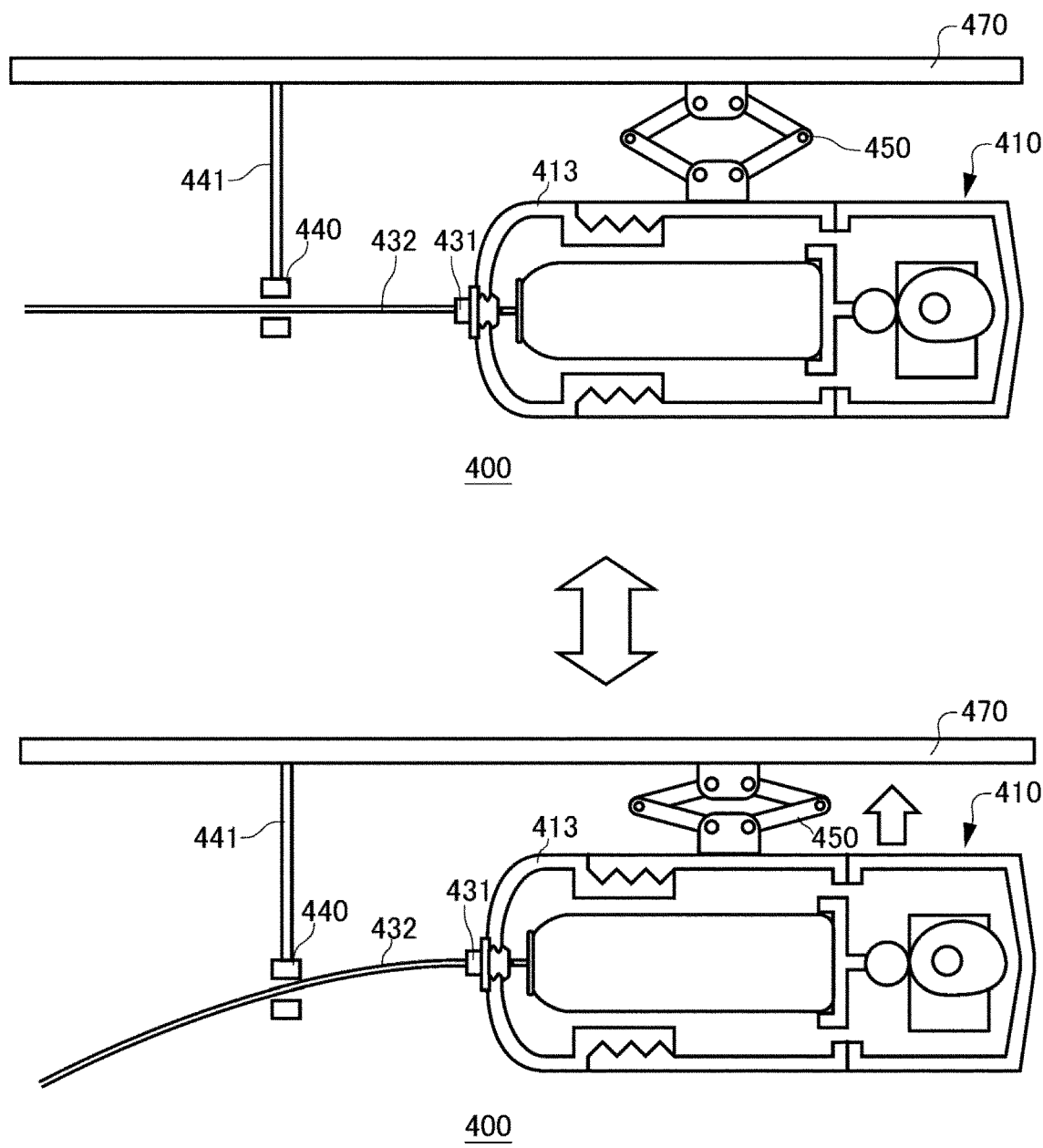
FIG. 4B shows an example of an operation method of the change unit 450.

FIG. 4B shows an example of an operation method of the change unit 450. In the present example, this operation method is different from the method of FIG. 4A in that the support 440 is fixed.

The change unit 450 changes the shape of the second flow channel 432 by changing the position of the first flow channel 431. The coupling unit 441 and the change unit 450 are fixed to a common fixture unit 470. For example, the change unit 450 changes the position of the first flow channel 431 by changing the position of the containing unit 410. Although the height of the containing unit 410 is changed in the change unit 450 of the present example, the containing unit 410 may be rotated and inclined. This allows the discharge apparatus 400 to change the discharge direction of the content. Instead of the fixture unit 470, the discharge apparatus 400 may be attached below the body unit 10.

Figure 4C:
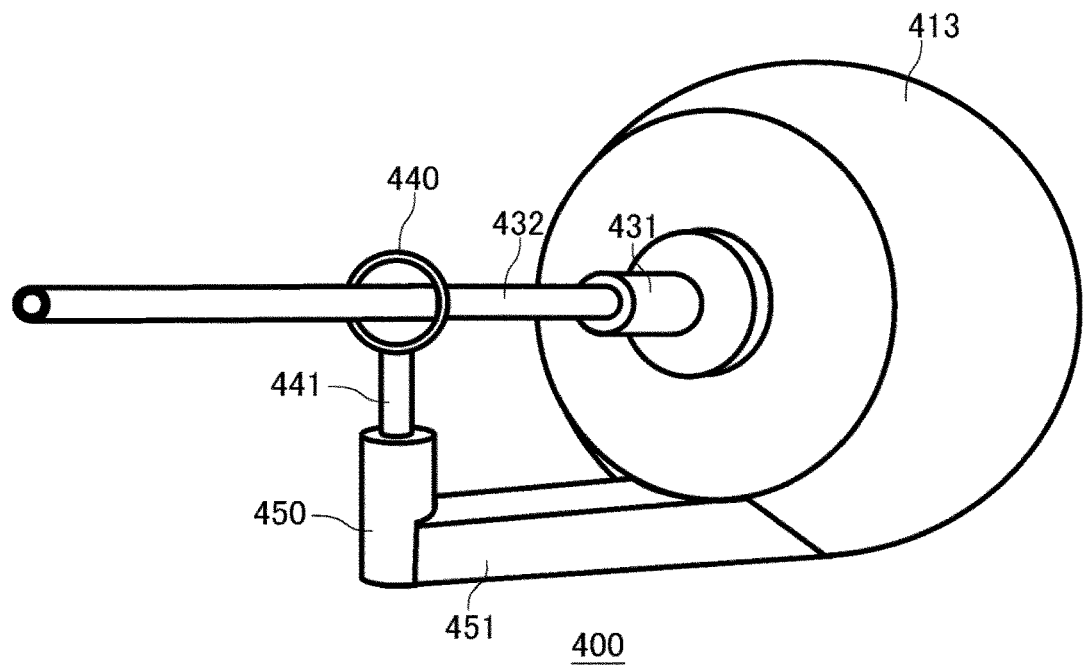
FIG. 4C shows an example of an operation method of the change unit 450.
Figure 4C:
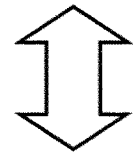
Figure 4C:
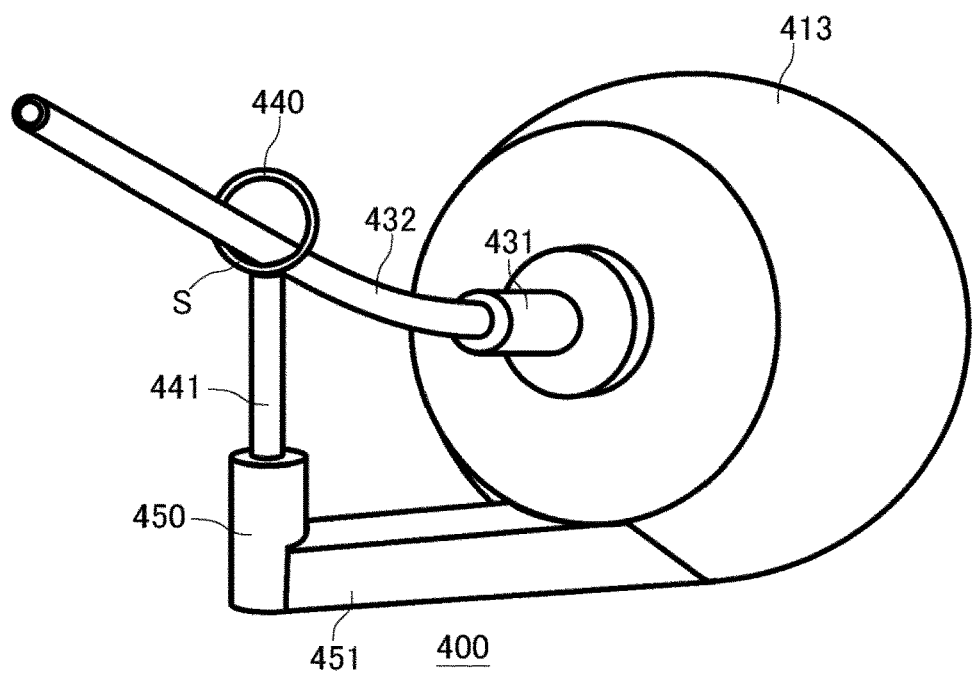

FIG. 4C shows an example of an operation method of the change unit 450. The change unit 450 of the present example changes the shape of the second flow channel 432 by translating the coupling unit 441. For example, the change unit 450 translates the coupling unit 441 in the direction where the coupling unit 441 extends, by a linear actuator. Thereby, the support 440 is translated to change the height. For example, the change unit 450 supports the second flow channel 432 at a supporting point S inside the support 440 by extending the coupling unit 441. Also, the change unit 450 may support the second flow channel 432 at a supporting point S inside the support 440 by retracting the coupling unit 441.

In this manner, the discharge apparatus 400 is not limited to the operation methods in FIGS. 4A to 4C as long as it can change the relative position relation between the support 440 and the first flow channel 431. For example, the discharge apparatus 400 may change the shape of the second flow channel 432 by changing positions of both the support 440 and the first flow channel 431.

Figure 5A:
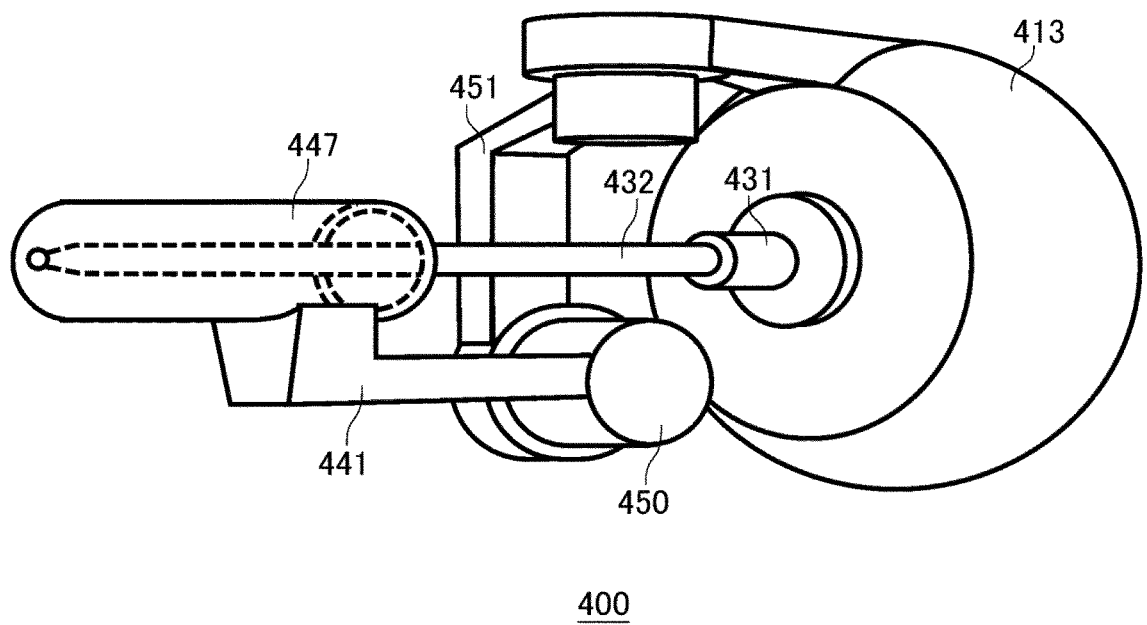
FIG. 5A shows an example of a configuration of the discharge apparatus 400 according to another example.

FIG. 5A shows an example of a configuration of the discharge apparatus 400 according to another example. The discharge apparatus 400 of the present example has, as the support 440, a supporting fixture member 447 for supporting the second flow channel 432. The supporting fixture member 447 is coupled to the change unit 450 by the coupling unit 441.

Figure 5B:
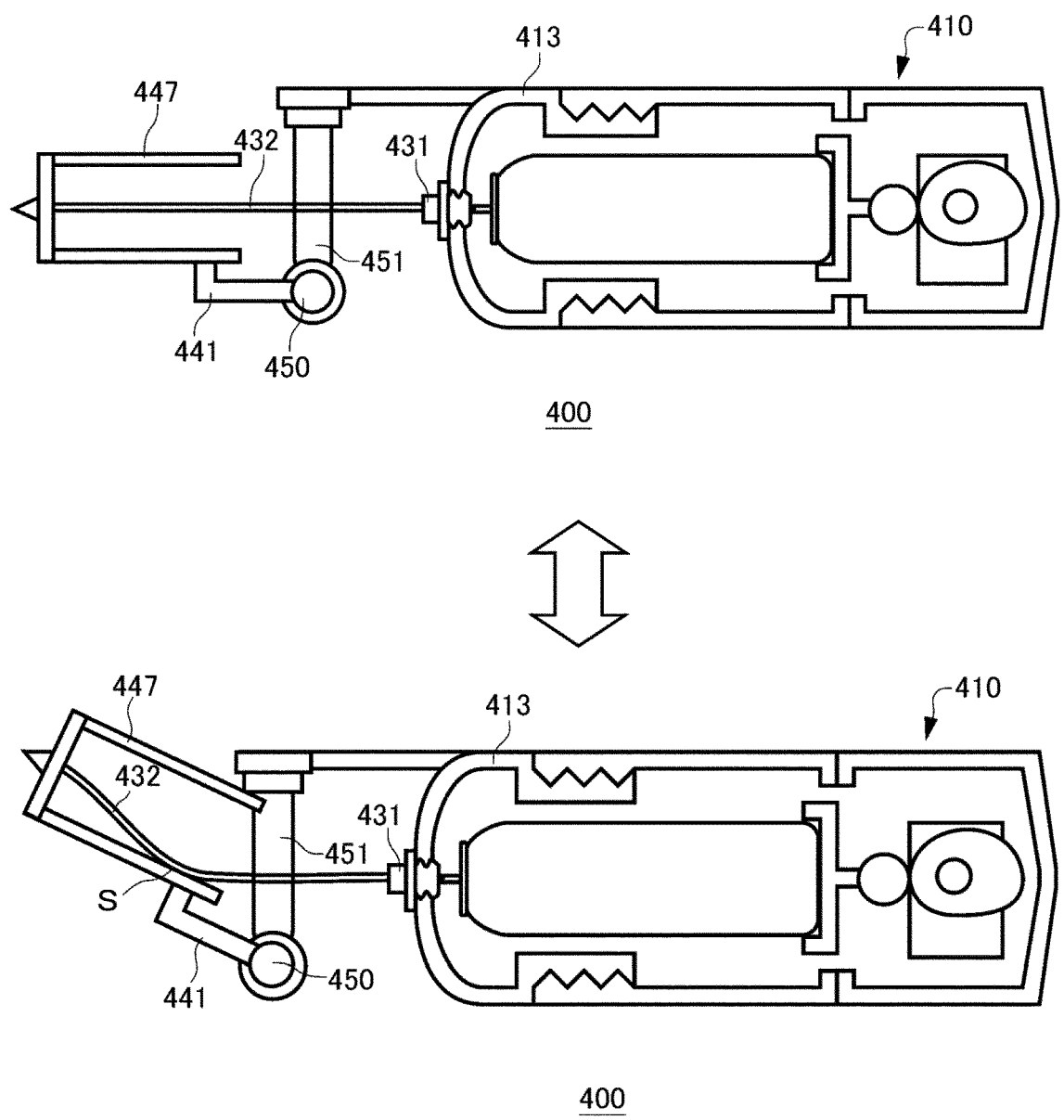
FIG. 5B shows an example of a cross-sectional view of the discharge apparatus 400 according to FIG. 5A.

FIG. 5B shows an example of a cross-sectional view of the discharge apparatus 400 according to FIG. 5A. In the discharge apparatus 400 of the present example, its discharge direction of contents is changed to a different direction.

The supporting fixture member 447 is fixed to the tip of the second flow channel 432 and supports at least a part of the second flow channel 432. Because the supporting fixture member 447 is fixed to the tip of the second flow channel 432, it also may serve as a discharge unit configured to discharge the contents in the container 70. Thanks to that the supporting fixture member 447 is fixed to the tip of the second flow channel 432, the second flow channel 432 becomes easily adjustable in the discharge direction. The inner diameter of the supporting fixture member 447 is greater than the outer diameter of the second flow channel 432. By enlarging the inner diameter of the supporting fixture member 447, the second flow channel 432 can be bent inside the supporting fixture member 447. Therefore, even if the second flow channel 432 is fixed to the supporting fixture member 447, the second flow channel 432 has allowances of deformation and has an appropriate curve, and thus a pressure loss in the second flow channel 432 can be reduced.

Figure 6A:
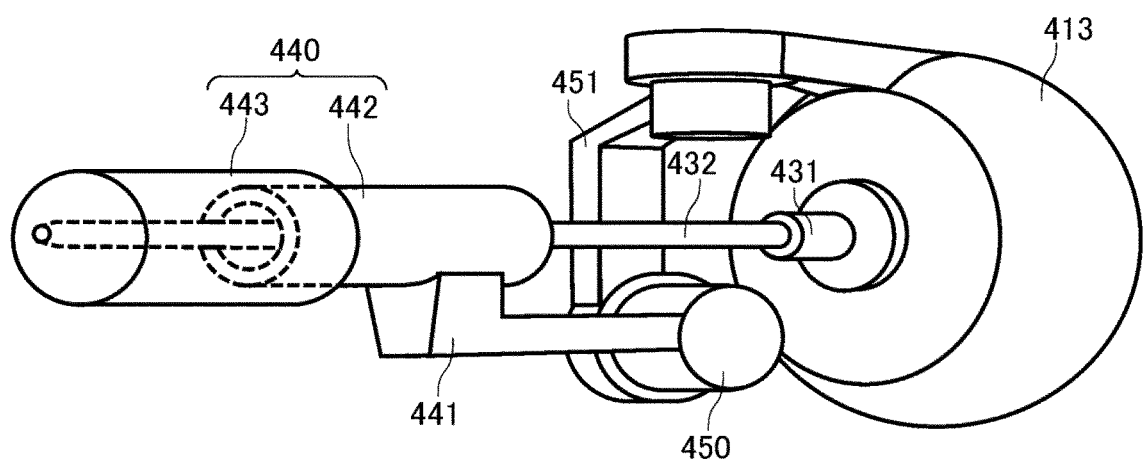
FIG. 6A shows an example of a configuration of the discharge apparatus 400 according to another example.

FIG. 6A shows an example of a configuration of the discharge apparatus 400 according to another example. The support 440 has a supporting member 442 and a tip member 443.

The supporting member 442 supports at least a part of the second flow channel 432. The supporting member 442 is coupled with the change unit 450 by the coupling unit 441. The supporting member 442 of the present example has an outer diameter that is smaller than an inner diameter of the tip member 443. That is, the supporting member 442 is inserted into the tip member 443.

The tip member 443 is fixed to the tip of the second flow channel 432. The tip member 443 is movable relative to the supporting member 442 in the axial direction of the second flow channel 432. The tip member 443 may also serve as a discharge unit configured to discharge the contents in the container 70.

Figure 6B:
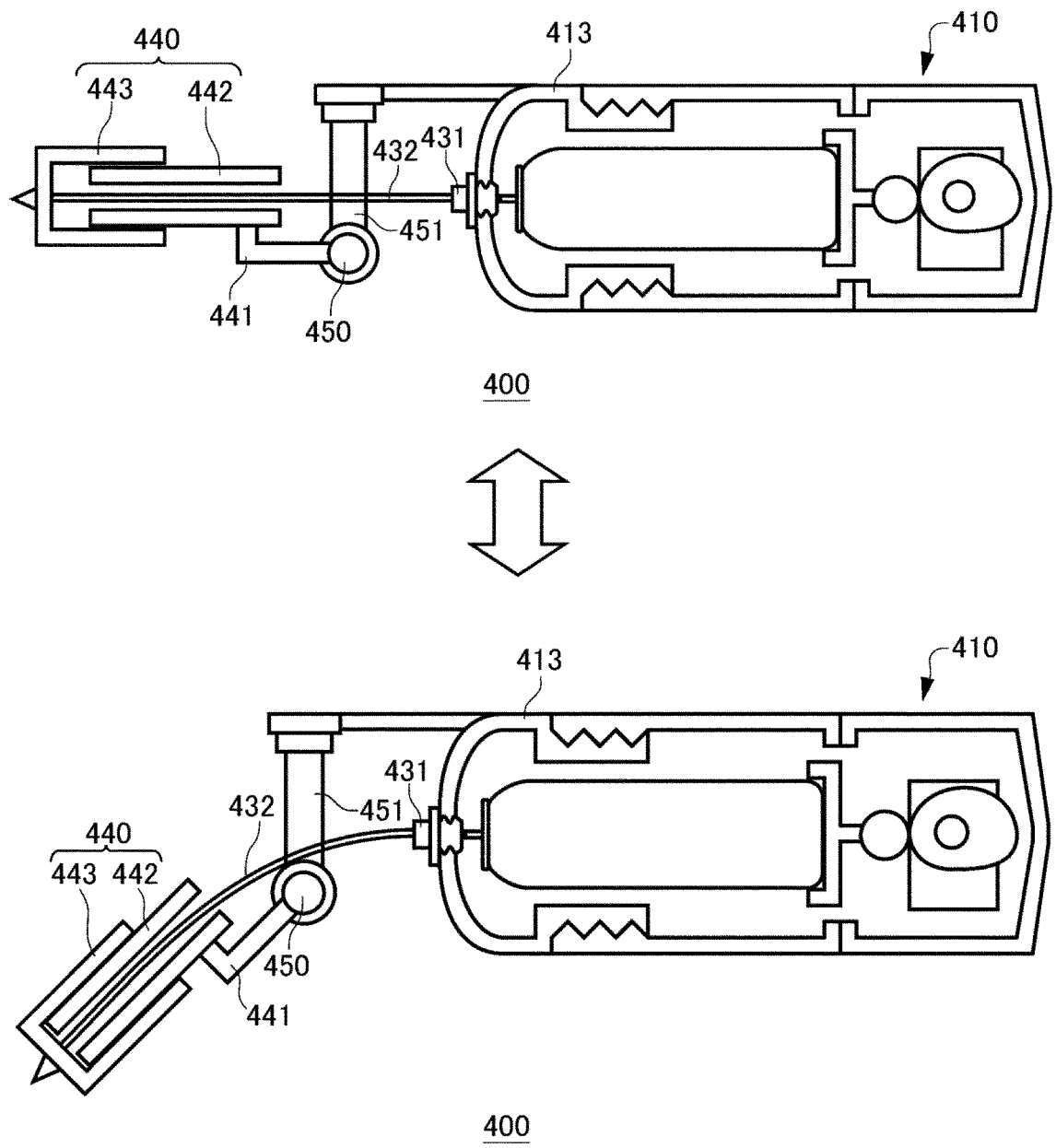
FIG. 6B shows an example of a cross-sectional view of the discharge apparatus 400 according to FIG. 6A.

FIG. 6B shows an example of a cross-sectional view of the discharge apparatus 400 according to FIG. 6A. In the discharge apparatus 400 of the present example, its discharge direction of contents is changed to a different direction.

Although the tip member 443 is fixed to the tip of the second flow channel 432, it is movable with respect to the supporting member 442. The supporting member 442 is rotationally moved about the axes of rotation of the change unit 450. Therefore, the second flow channel 432 takes a shortcut or a roundabout way depending on a position of the supporting member 442, and thereby the path length of the non-supporting section 462a may change. That is, the path length of the non-supporting section 462b changes. The tip member 443 can absorb a change in the non-supporting section 462b by moving in the axial direction of the second flow channel 432 with respect to the supporting member 442. Thereby, a pressure loss of the second flow channel 432 can be reduced. Also, because the tip member 443 keeps the common axis with the supporting member 442, the discharge direction can be set by the change unit 450.

Figure 7A:
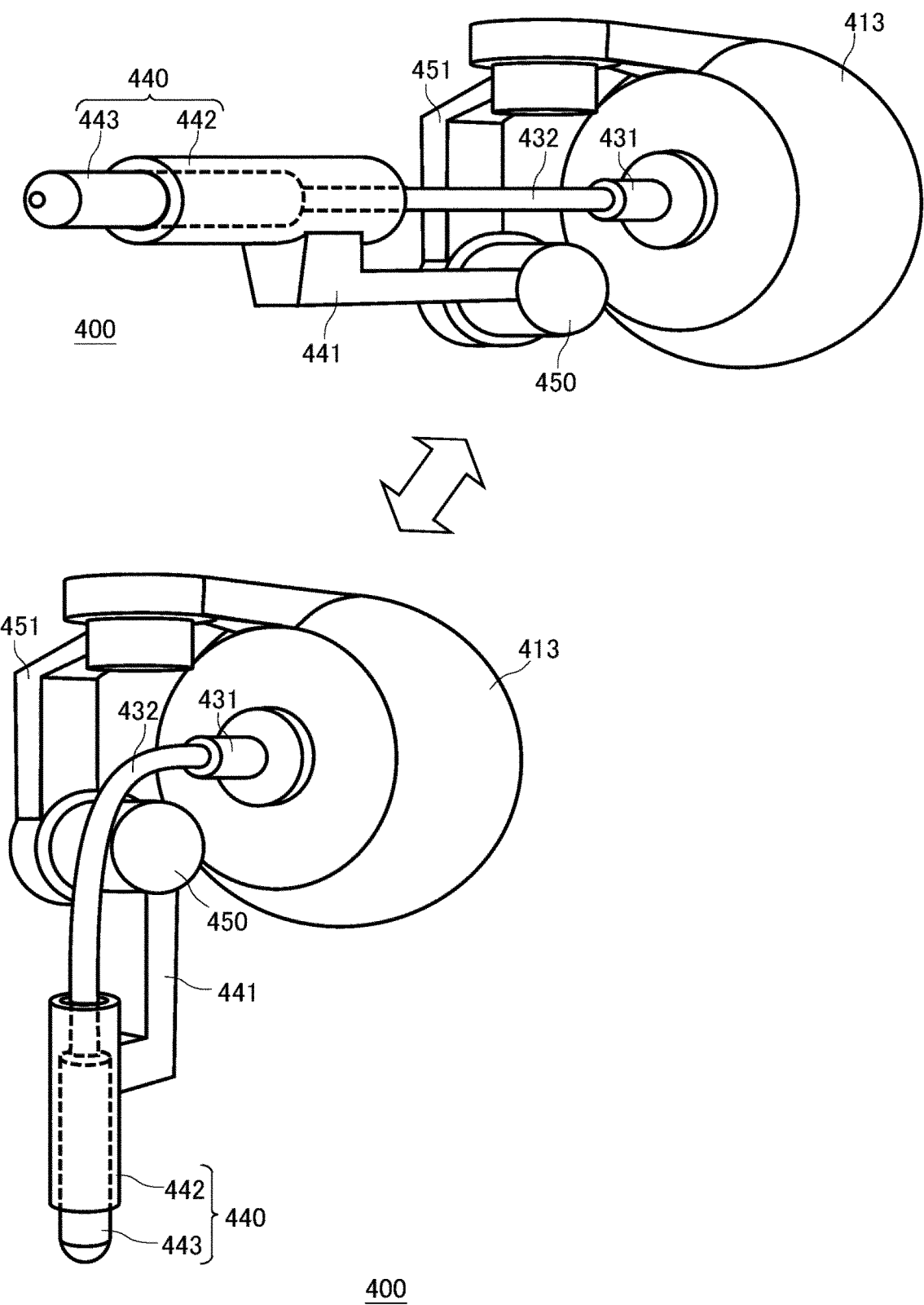
FIG. 7A shows an example of a configuration of the discharge apparatus 400 according to another example.

FIG. 7A shows an example of a configuration of the discharge apparatus 400 according to another example. The tip member 443 of the present example has an outer diameter that is smaller than an inner diameter of the supporting member 442. That is, the tip member 443 is inserted into the supporting member 442.

Figure 7B:
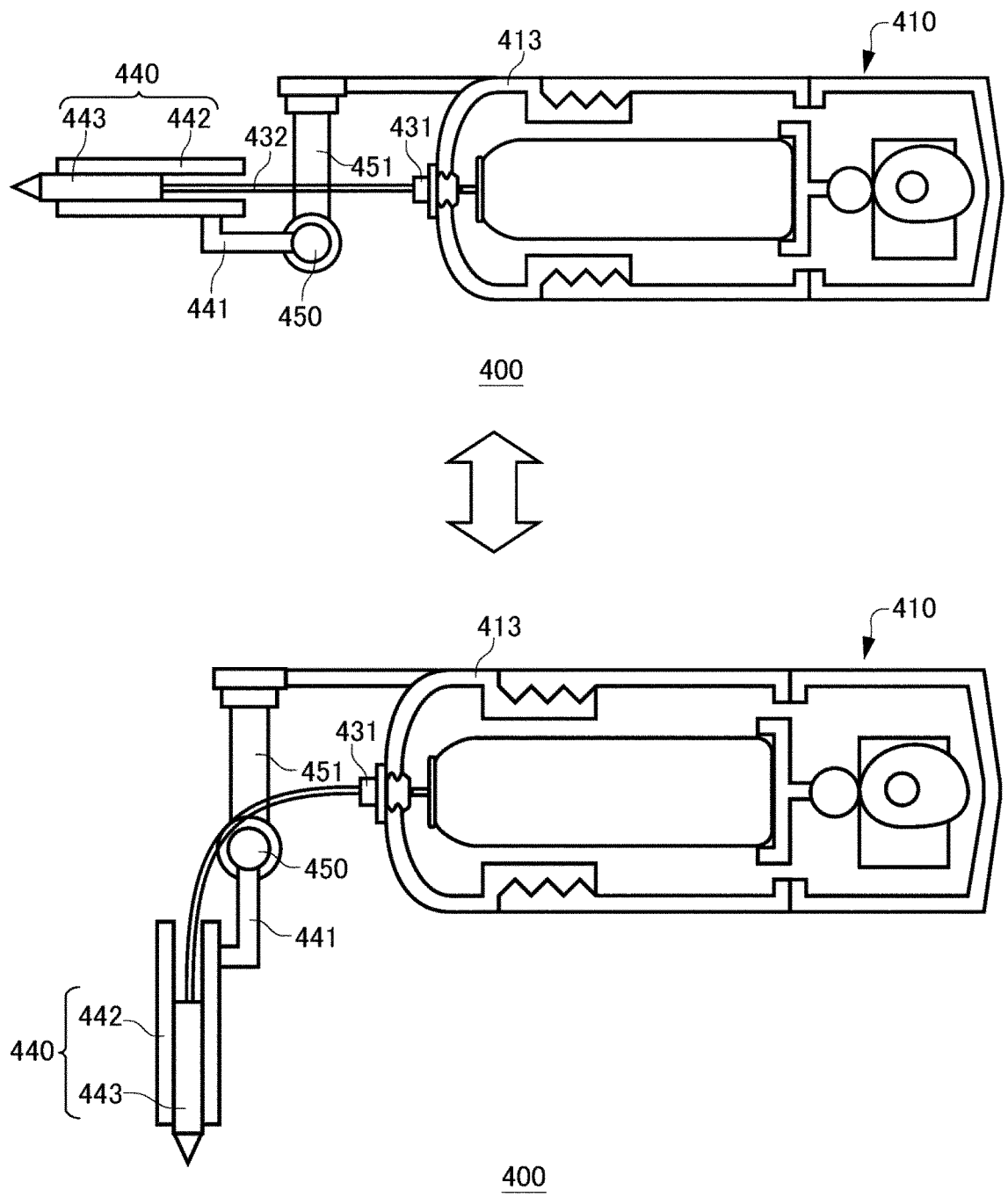
FIG. 7B shows an example of a cross-sectional view of the discharge apparatus 400 according to FIG. 7A.

FIG. 7B shows an example of a cross-sectional view of the discharge apparatus 400 according to FIG. 7A. In the discharge apparatus 400 of the present example, its discharge direction of contents is changed to a different direction.

Although the tip member 443 is fixed to the tip of the second flow channel 432, it is movable with respect to the supporting member 442. The supporting member 442 is rotationally moved about the axes of rotation of the change unit 450. Therefore, similar to the case of FIG. 6B, the second flow channel 432 takes a shortcut or a roundabout way depending on a position of the supporting member 442, and thereby the path length of the non-supporting section 462a may change. That is, the path length of the non-supporting section 462b changes. The tip member 443 can absorb a change in the non-supporting section 462b by moving in the axial direction of the second flow channel 432 with respect to the supporting member 442. In this manner, even if the tip member 443 is inserted into the supporting member 442, a pressure loss of the second flow channel 432 can be reduced. Also, because the tip member 443 keeps the common axis with the supporting member 442, the discharge direction can be set by the change unit 450.

Figure 8:
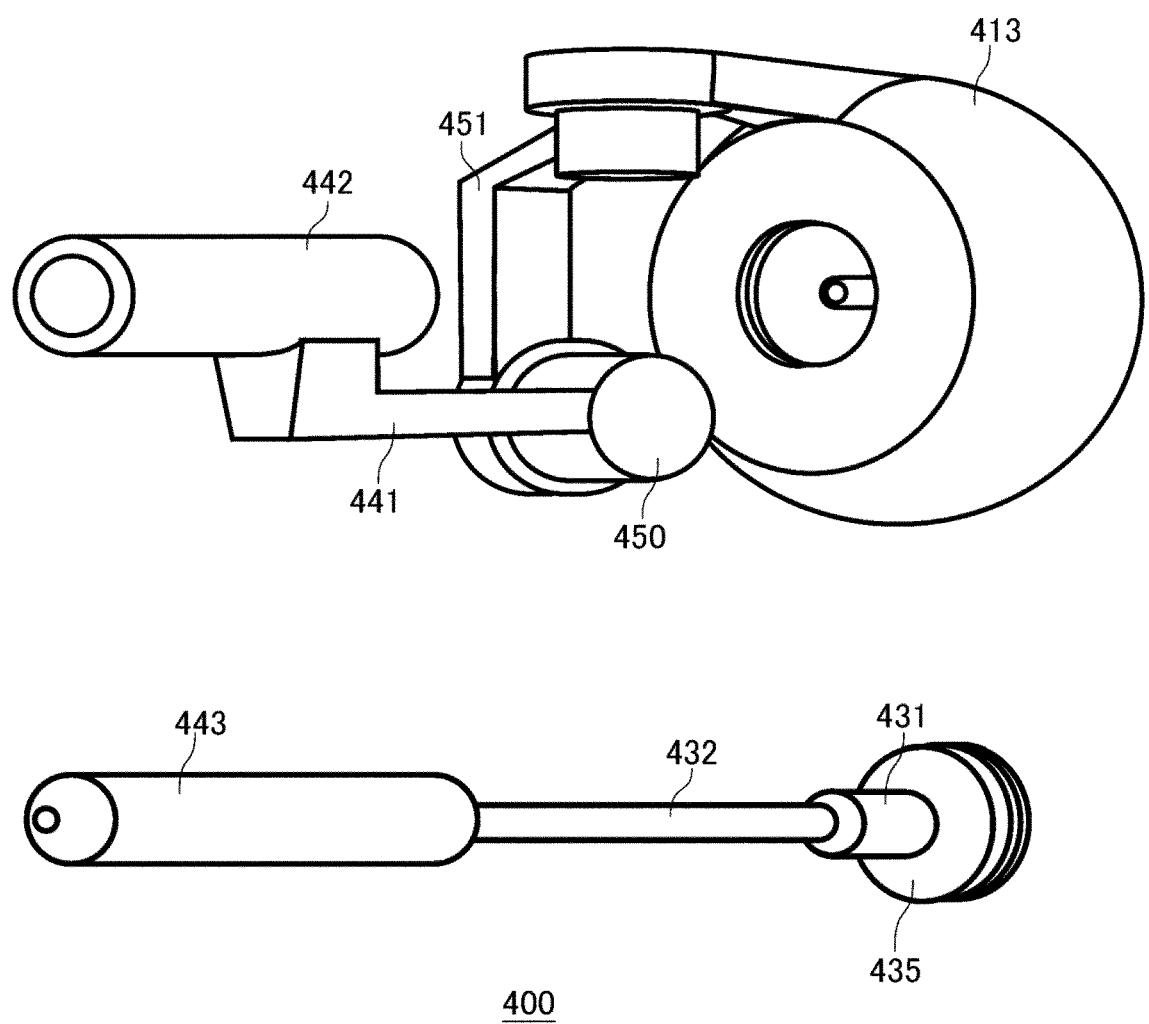
FIG. 8 shows an example of a decomposition method of the discharge apparatus 400.

FIG. 8 shows an example of a decomposition method of the discharge apparatus 400. Similar to FIGS. 7A and 7B, the decomposition method for the case where an outer diameter of the tip member 443 is smaller than an inner diameter of the supporting member 442 is shown. In the present example, the actuator 435 is attached to the first end cover unit 413 by a screw. By detaching the actuator 435, components on the tip side beyond the actuator 435 can be detached. The tip member 443 can be pulled out from the supporting member 442. Therefore, the first flow channel 431 and the second flow channel 432, which are likely to be contaminated by the contents in the container 70, can be replaced together at once. In this manner, the first flow channel 431 and the second flow channel 432 are easy to replace.

Figure 9A:
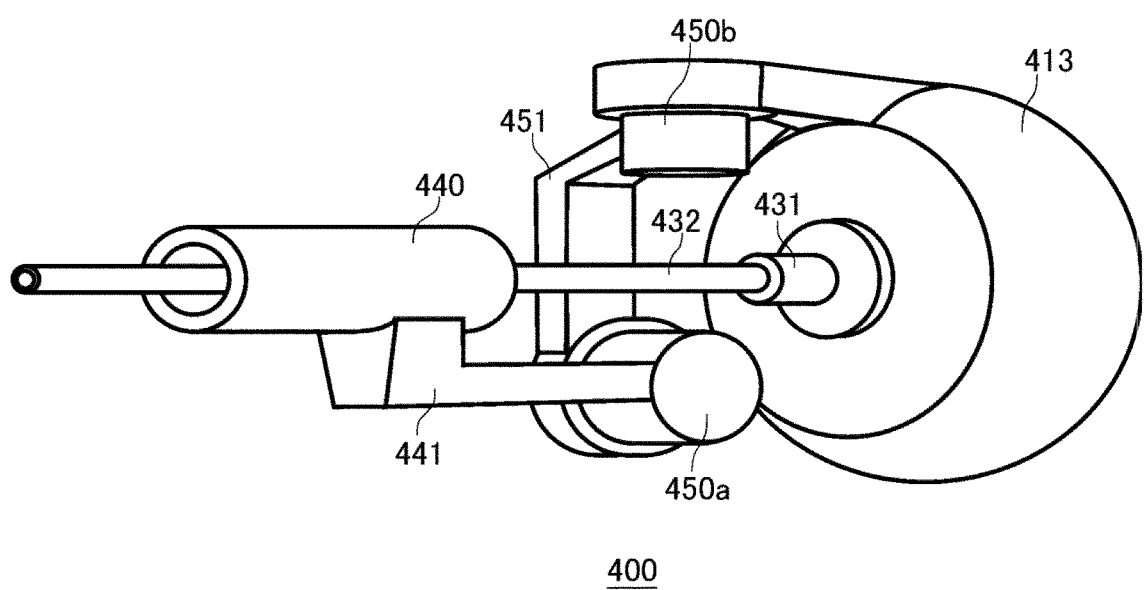
FIG. 9A shows an example of a configuration of the discharge apparatus 400 according to another example.

FIG. 9A shows an example of a configuration of the discharge apparatus 400 according to another example. The change unit 450 has a plurality of rotation mechanisms each of which is configured to rotate about a different axis. For example, the change unit 450 functions as a gimbal that can control its position freely in three axial directions. The change unit 450 includes the change units 450a and 450b as a rotation mechanism that each rotates in any directions. A respective rotation mechanism can rotate about an axis different from each other. In an example, the change unit 450a adjusts the height direction and the change unit 450b adjusts the crosswise direction.

Figure 9B:
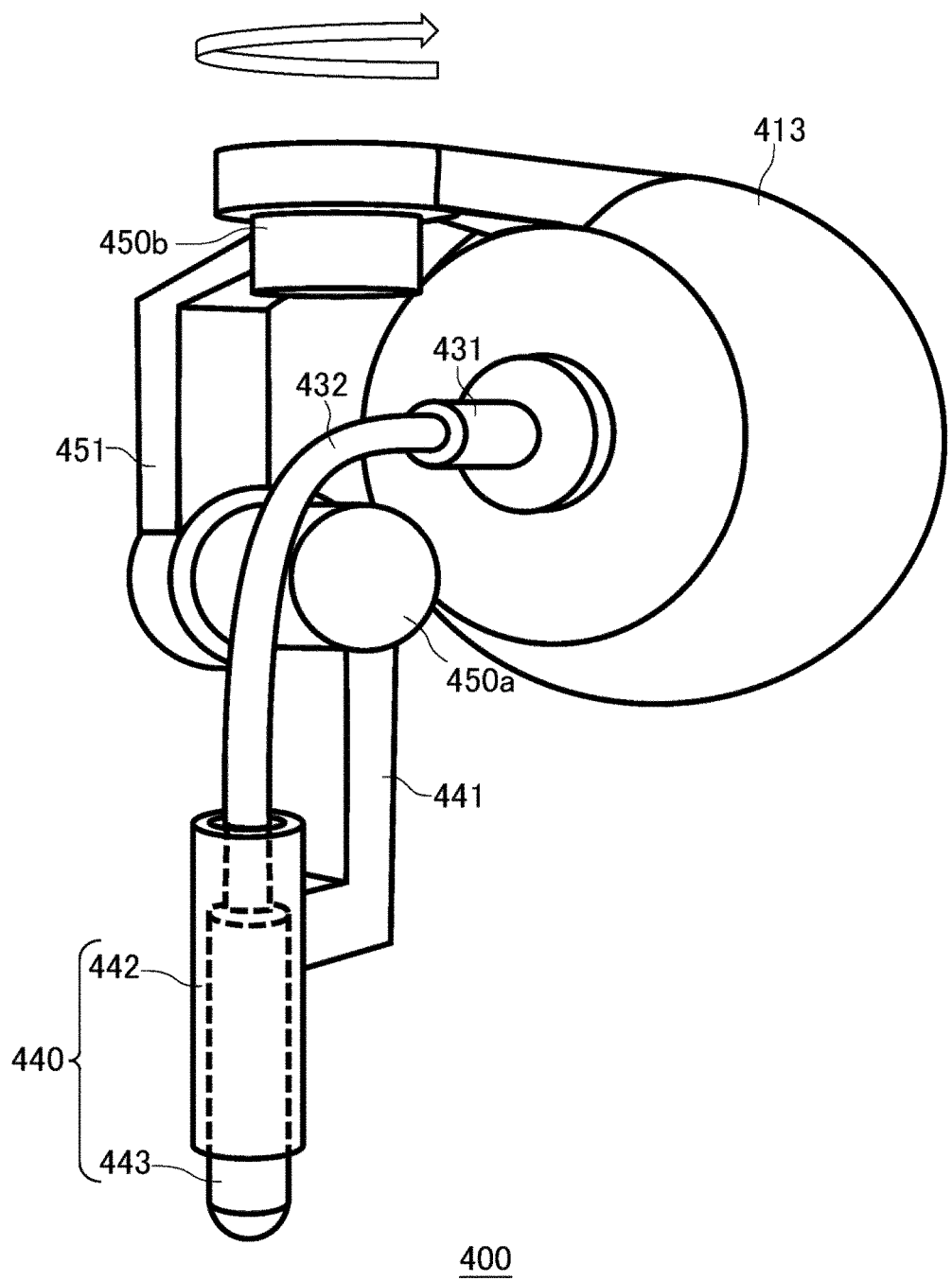
FIG. 9B shows an example of a configuration of the discharge apparatus 400 according to another example.

FIG. 9B shows an example of a configuration of the discharge apparatus 400 according to another example. The support 440 of the present example has the supporting member 442 and the tip member 443. In that the discharge apparatus 400 of the present example has a plurality of rotation mechanisms, it is different from the example of FIGS. 7A and 7B. In the present example, points different from the example of FIGS. 7A and 7B are described in particular. The discharge apparatus 400 of the present example includes the change units 450a and 450b, which have different axes of rotation.

The tip member 443 is fixed to the tip of the second flow channel 432. The tip member 443 is movable relative to the supporting member 442 in the circumferential direction of the second flow channel 432. That is, while the tip member 443 is fixed to the second flow channel 432, the supporting member 442 is able to freely rotate in the circumferential direction of the second flow channel 432.

Here, the tip member 443 is movable relative to the supporting member 442 in the axial direction of the second flow channel 432, and thereby a change in the non-supporting section 462b when the change unit 450a rotates can be absorbed. On the other hand, the tip member 443 is movable relative to the supporting member 442 in the circumferential direction of the second flow channel 432, and thereby a change in the second flow channel 432 when the change unit 450b rotates can be absorbed. In this case, the supporting member 442 rotates in the circumferential direction of the second flow channel 432 and the tip member 443 is fixed in the circumferential direction of the second flow channel 432.

Even when the discharge apparatus 400 of the present example has a plurality of rotation mechanisms, it can retain the second flow channel 432 in an appropriate shape. That is, because the tip member 443 is movable relative to the supporting member 442 in the axial direction and the circumferential direction of the second flow channel 432, a torsion of the second flow channel 432 can be prevented.

Therefore, a distortion resistance generated by the torsion of the second flow channel 432 decreases and the load on the change unit 450 can be reduced. Also, fatigue generated in the second flow channel 432 can be mitigated.

Figure 9C:
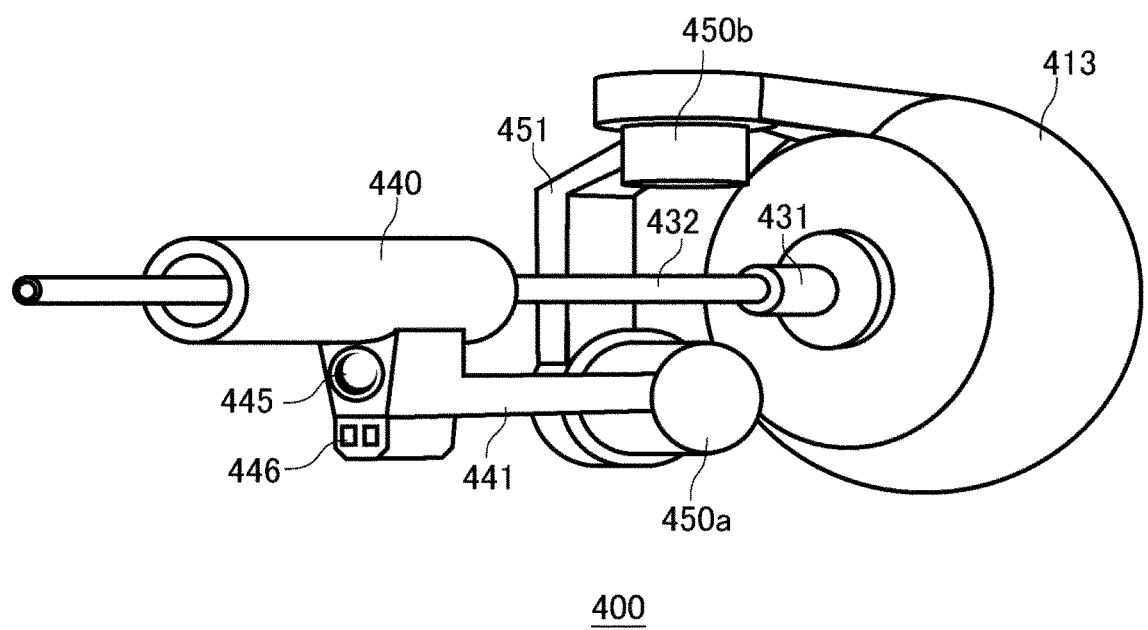
FIG. 9C shows an example of a configuration of the discharge apparatus 400 according to another example.

FIG. 9C shows an example of a configuration of the discharge apparatus 400 according to another example. The discharge apparatus 400 includes a camera 445 and a distance-measurement sensor 446.

The camera 445 captures the discharge direction of the discharge apparatus 400. The camera 445 of the present example is provided on the support 440 so as to capture the discharge direction. Thereby, the position of the camera 445 is changed in response to a change in the position of the support 440. Therefore, it facilitates monitoring the discharging state. Also, it facilitates aiming when discharging. Note that the position of the camera 445 may be fixed.

The distance-measurement sensor 446 measures a distance from an object that is in the discharge direction of the discharge apparatus 400. The distance-measurement sensor 446 of the present example is provided on the support 440 so as to measure the distance along the discharge direction. Thereby, the position of the distance-measurement sensor 446 can be changed in response to a change in the position of the support 440. Therefore, it becomes possible to correct the distance in aiming when discharging. Note that the position of the distance-measurement sensor 446 may be fixed.

Figure 10:
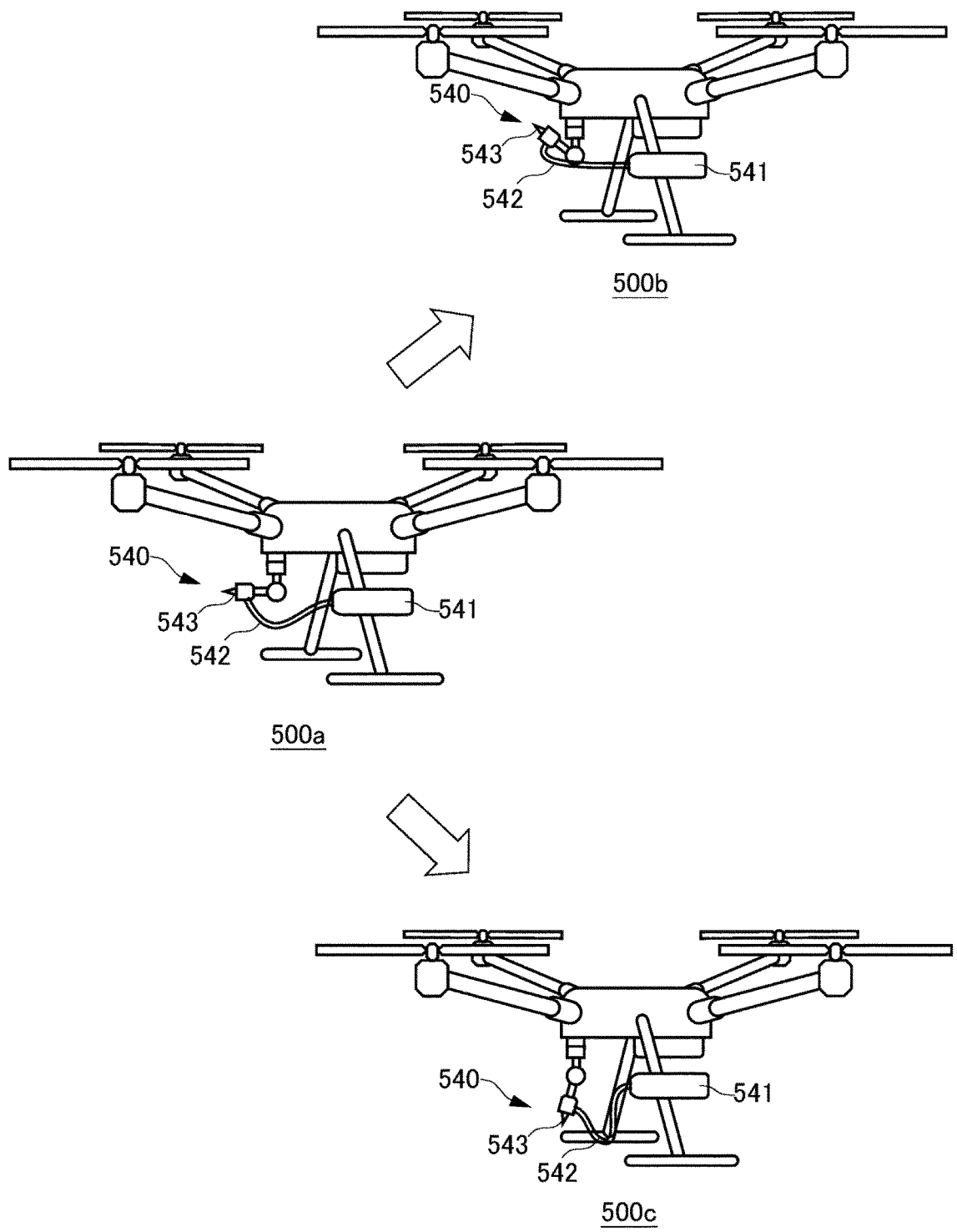
FIG. 10 shows an example of a configuration of the unmanned aerial vehicle 500 according to a comparative Example.

FIG. 10 shows an example of a configuration of the unmanned aerial vehicle 500 according to a comparative Example. The unmanned aerial vehicle 500 of the present example includes a discharge apparatus 540. In the present example, using the unmanned aerial vehicle 500a as the reference state, the case where the discharge direction is changed to the unmanned aerial vehicle 500b or the unmanned aerial vehicle 500c is described.

The discharge apparatus 540 has a containing unit 541, a tube 542, and a nozzle 543. The discharge apparatus 540 of the present example connects the nozzle 543 to the aerosol container via the tube 542. The discharge apparatus 540 controls the discharge direction by changing the position of the nozzle 543. When the position of the nozzle 543 is changed, the distance between the nozzle 543 and the containing unit 541 changes. Therefore, the tube 542 has at least a length that is a maximum separation distance or longer able to be produced by the nozzle 543 and the containing unit 541.

However, because both ends of the tube 542 are fixed in the discharge apparatus 540, a pressure loss may increase by a piping resistance of the tube 542. Also, if the tube 542 is twisted, liquid in the tube 542 may be spoiled.

For example, in the unmanned aerial vehicle 500b, the position of the nozzle 543 is moved in the direction in which it moves away from the containing unit 541. In this case, because the tube 542 becomes in the tensile state and a bent section with a small radius is formed in the tube 542, a piping resistance increases.

In the unmanned aerial vehicle 500c, the position of the nozzle 543 is moved in the direction in which it comes close to the containing unit 541. In this case, the tube 542 becomes in the compressed state, becoming easy to be twisted. If the tube 542 is twisted, a plurality of bent sections is generated in the tube 542, and thus a piping resistance increases. Also, if a drain trap shaped twist is generated in the tube 542, a residue tends to remain in the tube 542.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

REFERENCE SIGNS LIST

10 . . . Body unit, 15 . . . Leg unit, 20 . . . Propelling unit, 21 . . . Rotary blade, 22 . . . Rotation drive unit, 24 . . . Arm unit, 70 . . . Container, 71 . . . Stem, 100 . . . Unmanned aerial vehicle, 200 . . . Terminal device, 210 . . . Display unit, 220 . . . Controller, 300 . . . Discharge system, 400 . . . Discharge apparatus, 410 . . . Containing unit, 411 . . . Body, 413 . . . First end cover unit, 414 . . . Second end cover unit, 415 . . . Screw unit, 420 . . . Discharge drive unit, 421 . . . Cam, 422 . . . Cam follower, 423 . . . Movable plate, 431 . . . First flow channel, 432 . . . Second flow channel, 435 . . . Actuator, 440 . . . Support, 441 . . . Coupling unit, 442 . . . Supporting member, 443 . . . Tip member, 445 . . . Camera, 446 . . . Distance-measurement sensor, 447 . . . Supporting fixture member, 450 . . . Change unit, 451 . . . Coupling unit, 460 . . . Supporting section, 462 . . . Non-supporting section, 470 . . . Fixture unit, 500 . . . Unmanned aerial vehicle, 540 . . . Discharge apparatus, 541 . . . Containing unit, 542 . . . Tube, 543 . . . Nozzle

What is claimed is:

1. A discharge apparatus for discharging contents in an aerosol container, comprising:
   a first flow channel connected to the aerosol container;
   a second flow channel connected to the first flow channel;
   a support configured to support at least a part of the second flow channel; and
   a change unit configured to change a shape of the second flow channel, wherein
   the support has
      a supporting member configured to support at least a part of the second flow channel, and
      a tip member fixed to a tip of the second flow channel, and configured to keep a common axis with the supporting member and configured to slide relative to the supporting member,
   the support changes a support position of the second flow channel in response to the supporting member pivoting around the change unit causing the change in the shape of the second flow channel, and
   the shape of the second flow channel is changed according to a relative position relation of a connecting portion to the first flow channel, the support position and the tip of the second flow channel.

2. The discharge apparatus according to claim 1, wherein the second flow channel has
   a supporting section that can be supported by the support, and
   a non-supporting section that is different from the supporting section, wherein the supporting section and the non-supporting section are configured to change in response to the change in the shape of the second flow channel by the change unit.

3. The discharge apparatus according to claim 1, comprising
a containing unit configured to contain the aerosol container,
wherein the first flow channel is fixed to the containing unit.

4. The discharge apparatus according to claim 1,
wherein the support has a circular structure through which the second flow channel penetrates.

5. The discharge apparatus according to claim 1,
wherein the change unit is coupled to the support, and is configured to change the shape of the second flow channel by changing a position of the support.

6. The discharge apparatus according to claim 1,
wherein the change unit is configured to change a shape of the second flow channel by changing its position relative to the first flow channel.

7. The discharge apparatus according to claim 1,
wherein the support has a tubular structure inside which the second flow channel passes,
wherein the change unit is configured to change the shape of the second flow channel by rotationally moving the support in a predefined direction.

8. The discharge apparatus according to claim 7,
wherein the tip of the second flow channel is free with respect to the support.

9. The discharge apparatus according to claim 1,
wherein the change unit has a plurality of rotation mechanisms each of which is configured to rotate about a different axis.

10. The discharge apparatus according to claim 1,
wherein the support has an annular structure inside which the second flow channel passes,
wherein the change unit is configured to change the shape of the second flow channel by translating or rotationally moving the support in a predefined translated or rotational direction.

11. The discharge apparatus according to claim 1,
wherein the tip member is further configured to support at least a part of the second flow channel.

12. The discharge apparatus according to claim 1,
wherein the tip member also serves as a discharge unit configured to discharge contents in the aerosol container.

13. The discharge apparatus according to claim 1,
wherein the support further has a camera.

14. The discharge apparatus according to claim 1,
wherein the support further has a distance-measurement sensor for measuring a distance from an object.

15. A vehicle comprising:
an unmanned aerial vehicle; and
the discharge apparatus according to claim 1 mounted on the unmanned aerial vehicle.

16. A discharge apparatus for discharging contents in an aerosol container, comprising:
a first flow channel connected to the aerosol container;
a second flow channel connected to the first flow channel;
a support configured to support at least a part of the second flow channel;
a change unit configured to change a shape of the second flow channel; and
a coupling unit for coupling the support to a fixture unit provided separately from the discharge apparatus,
wherein the support changes a support position of the second flow channel in response to the change in the shape of the second flow channel,
the change unit is fixed apart from a position coupling the fixture unit and the coupling unit, and
the change unit is configured to change the shape of the second flow channel by changing a position of the aerosol container with respect to the fixture unit.

17. A discharge apparatus for discharging contents in an aerosol container, comprising:
a first flow channel connected to the aerosol container;
a second flow channel connected to the first flow channel;
a support configured to support at least a part of the second flow channel; and
a change unit configured to change a shape of the second flow channel, wherein
the support has
a supporting member configured to support at least a part of the second flow channel, and
a tip member fixed to a tip of the second flow channel, and configured to keep a common axis with the supporting member and configured to slide relative to the supporting member,
the support changes a support position of the second flow channel in response to a change in the shape of the second flow channel,
the shape of the second flow channel is changed according to a relative position relation of a connecting portion to the first flow channel, the support position and the tip of the second flow channel, and
the tip member slides in relation to the supporting member when the change unit causes the second flow channel to pivot around the change unit.

18. The discharge apparatus according to claim 2, further comprising:
a containing unit configured to contain the aerosol container,
wherein the first flow channel is fixed to the containing unit.

* * * * *